US009851856B2

(12) United States Patent
Cordeiro et al.

(10) Patent No.: US 9,851,856 B2
(45) Date of Patent: Dec. 26, 2017

(54) TOUCH PANELS FOR WIDE ASPECT RATIO APPLICATIONS

(71) Applicant: 3M INNOVATIVE PROPERTIES COMPANY, St. Paul, MN (US)

(72) Inventors: Craig A. Cordeiro, Westford, MA (US); Thomas J. Rebeschi, Merrimack, NH (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 14/911,104

(22) PCT Filed: Sep. 23, 2014

(86) PCT No.: PCT/US2014/056878
§ 371 (c)(1),
(2) Date: Feb. 9, 2016

(87) PCT Pub. No.: WO2015/047976
PCT Pub. Date: Apr. 2, 2015

(65) Prior Publication Data
US 2016/0202797 A1 Jul. 14, 2016

Related U.S. Application Data

(60) Provisional application No. 61/882,350, filed on Sep. 25, 2013.

(51) Int. Cl.
*G06F 3/045* (2006.01)
*G06F 3/044* (2006.01)
*G06F 3/041* (2006.01)
(52) U.S. Cl.
CPC ............ *G06F 3/044* (2013.01); *G06F 3/0416* (2013.01)

(58) Field of Classification Search
CPC ........ G06F 3/041; G06F 3/0416; G06F 3/044; G06F 2203/04103; G06F 2203/04104; G06F 2203/04111
See application file for complete search history.

(56) References Cited

U.S. PATENT DOCUMENTS 8,525,799 B1 9/2013 Grivna et al.
9,063,596 B2 6/2015 Wang et al.
(Continued)

FOREIGN PATENT DOCUMENTS

EP 2 444 879 4/2012

OTHER PUBLICATIONS

PCT International Search Report from PCT/US2014/056878 dated Dec. 12, 2014, 4 pages.

*Primary Examiner* — Joe H Cheng
(74) *Attorney, Agent, or Firm* — Robert S. Moshrefzadeh

(57) ABSTRACT

A touch sensitive system includes a touch sensitive area. A plurality of spaced apart first electrodes are disposed in the touch sensitive area and extend continuously along a first direction. A plurality of spaced apart second electrodes are disposed in the touch sensitive area and extend continuously along a different second direction. A plurality of nodes are disposed in the touch sensitive area, each node being defined by corresponding first and second electrodes traversing each other at the node. The touch sensitive system detect a location of a touch applied proximate a node by detecting a change in a coupling capacitance between the corresponding first and second electrodes traversing each other at the node. Each first electrode traverses at least one, but not all, of the second electrodes, and each second electrode traverses at least one, but not all, of the first electrodes.

19 Claims, 14 Drawing Sheets

(56) References Cited

U.S. PATENT DOCUMENTS

| | | | |
|---|---|---|---|
| 9,069,420 B2 | 6/2015 | Liu | |
| 9,075,526 B2 | 7/2015 | Lin et al. | |
| 2006/0097991 A1* | 5/2006 | Hotelling | G06F 3/0416 345/173 |
| 2008/0150906 A1 | 6/2008 | Grivna | |
| 2009/0184937 A1 | 7/2009 | Grivna | |
| 2009/0273573 A1* | 11/2009 | Hotelling | G06F 3/0362 345/173 |
| 2009/0284495 A1* | 11/2009 | Geaghan | G06F 3/0416 345/174 |
| 2011/0187677 A1* | 8/2011 | Hotelling | G06F 3/0412 345/174 |
| 2011/0273383 A1* | 11/2011 | Jeon | G06F 3/044 345/173 |
| 2012/0032916 A1* | 2/2012 | Enoki | G06F 3/044 345/174 |
| 2012/0062497 A1* | 3/2012 | Rebeschi | G06F 3/03545 345/174 |
| 2012/0062498 A1* | 3/2012 | Weaver | G06F 3/03545 345/174 |
| 2012/0200506 A1* | 8/2012 | Taylor | G06F 3/041 345/173 |
| 2013/0057493 A1* | 3/2013 | Hwang | G06F 3/0418 345/173 |
| 2013/0168221 A1 | 7/2013 | Xie et al. | |
| 2013/0234973 A1 | 9/2013 | Kim et al. | |
| 2014/0028607 A1* | 1/2014 | Tan | G06F 3/044 345/174 |
| 2014/0043278 A1* | 2/2014 | Rebeschi | G06F 3/0416 345/174 |
| 2014/0063719 A1* | 3/2014 | Yamazaki | G06F 1/1601 361/679.21 |
| 2014/0069796 A1* | 3/2014 | Kang | G06F 1/16 200/600 |
| 2014/0118302 A1* | 5/2014 | Park | G06F 3/044 345/174 |
| 2014/0320756 A1* | 10/2014 | Shih | G06F 3/045 349/12 |
| 2014/0375910 A1* | 12/2014 | Tada | G06F 3/044 349/12 |
| 2015/0022736 A1* | 1/2015 | Kim | H05K 1/0274 349/12 |
| 2016/0070413 A1* | 3/2016 | Geaghan | G06F 3/0416 345/174 |

* cited by examiner

TOUCH PANELS FOR WIDE ASPECT RATIO APPLICATIONS

TECHNICAL FIELD

This disclosure relates generally to touch sensitive devices, and to processes and systems related to such devices.

BACKGROUND

Touch sensitive devices allow a user to conveniently interface with electronic systems and displays by reducing or eliminating the need for mechanical buttons, keypads, keyboards, and pointing devices. For example, a user can carry out a complicated sequence of instructions by simply touching an on-display touch screen at a location identified by an icon.

There are several types of technologies for implementing a touch sensitive device including, for example, resistive, infrared, capacitive, surface acoustic wave, electromagnetic, near field imaging, etc. Capacitive touch sensing devices have been found to work well in a number of applications. In many touch sensitive devices, the input is sensed when a conductive object in the sensor is capacitively coupled to a conductive touch implement such as a user's finger. Generally, whenever two electrically conductive members come into proximity with one another without actually touching, a capacitance is formed therebetween. In the case of a capacitive touch sensitive device, as an object such as a finger approaches the touch sensing surface, a capacitance forms between the object and the sensing points in close proximity to the object. By detecting changes in capacitance at each of the sensing points and noting the position of the sensing points, the sensing circuit can recognize multiple objects and determine the characteristics of the object as it is moved across the touch surface.

BRIEF SUMMARY

Some embodiments involve a touch sensitive system. The touch sensitive system includes a touch sensitive area. A plurality of spaced apart first electrodes are disposed in the touch sensitive area and extend along a first direction. A plurality of spaced apart second electrodes are disposed in the touch sensitive area and extend along a different second direction. Each first and second electrode extends continuously across the touch sensitive area. A plurality of nodes are disposed in the touch sensitive area, each node being defined by corresponding first and second electrodes traversing each other at the node. The touch sensitive system is configured to detect a location of a touch applied proximate a node by detecting a change in a coupling capacitance between the corresponding first and second electrodes traversing each other at the node. Each first electrode traverses at least one, but not all, of the second electrodes, and each second electrode traverses at least one, but not all, of the first electrodes.

These and other aspects of the present application will be apparent from the detailed description below. In no event, however, should the above summaries be construed as limitations on the claimed subject matter, which subject matter is defined solely by the attached claims.

BRIEF DESCRIPTION OF THE DRAWINGS

In the figures, like reference numerals designate like elements.

DESCRIPTION OF ILLUSTRATIVE EMBODIMENTS

Displays can be characterized by their aspect ratio which is the relationship of the display's width to the display's height. The display aspect ratio is referred to in the form "width:height", e.g., 16:9, 5:4, 4:3, etc. Embodiments disclosed herein are particularly useful for widescreen or very widescreen touch sensitive systems that include displays having aspect ratios where the width, W, may be 2, 3, 4, 5, or more times greater than the height, H.

Figure 1A:
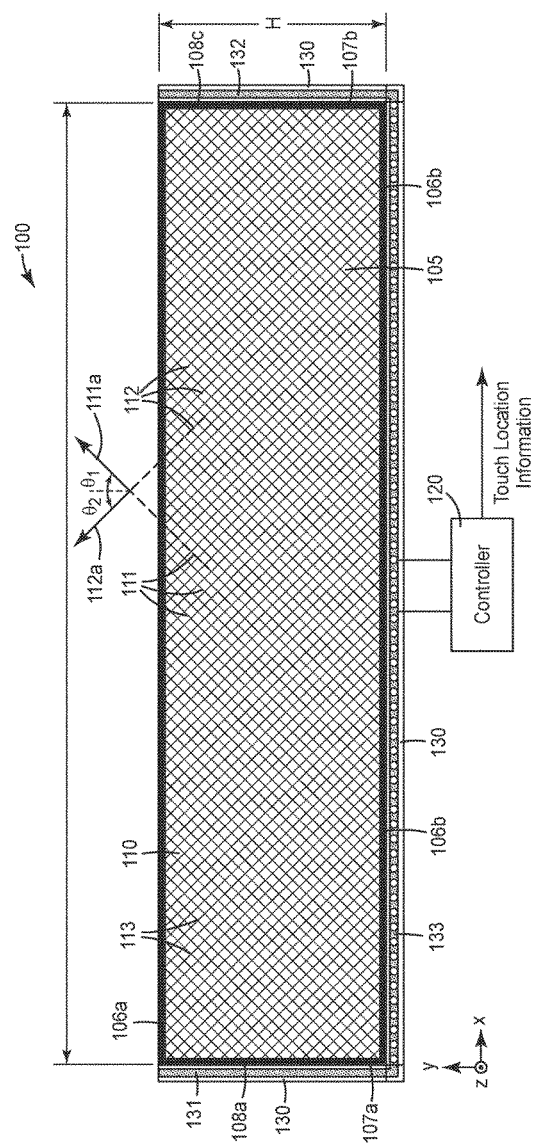
FIG. 1A is a block diagram of a touch sensitive system that includes a touch panel and a controller in accordance with some embodiments.

FIG. 1A illustrates a touch sensitive system 100 that includes a touch panel 110 and a controller 120. The touch panel 110 can be substantially transparent so that a user is able to view an object, such as the pixilated display of a computer, hand-held device, mobile phone, or other peripheral device, through the touch panel 110. For example, a touch sensitive system may also include a visual display (not shown in FIG. 1A) arranged in conjunction with a transparent touch panel to form an interactive touch sensitive display. A user may interact with the touch sensitive display, for example, providing user input by touching icons or areas displayed on touch sensitive display and viewable through the transparent touch panel.

The touch panel 110 can use capacitive coupling to detect locations of one or more touches on a touch sensitive area 105 of the touch panel 110. The touch sensitive area 105 is continuous and includes a plurality of spaced apart first electrodes 111 and a plurality of spaced apart second electrodes 112. The first electrodes 111 can be electrically coupled to the controller 120 so that the first electrodes 111 provide drive electrodes for the touch sensitive area 105. The second electrodes 112 can be coupled to the controller 120 to function as receive electrodes for the touch sensitive area 105. The controller 120 can be arranged to provide drive signals to drive electrodes 111 and to sense response signals from receive electrodes 112. The drive and receive electrodes 111, 112 extend continuously across the touch sensitive area 105 traverse each other at nodes 113. The touch sensitive system 100 is configured to detect a location of a touch applied proximate a node 113 by detecting a change in a coupling capacitance between the corresponding drive and receive electrodes 111, 112 traversing each other at the node 113. The controller 120 is configured to apply drive signals to the drive electrodes 111 and to sense signals present on the receive electrodes 112 responsive to the touch. The controller 120 processes the sensed signals to determine touch location information.

The drive electrodes 111 are spaced apart in the touch sensitive area 105 and extend along a first direction. The receive 112 electrodes are spaced apart in the touch sensitive area 105 and extend along a second direction, different from the first direction. The touch sensitive area 105 is continuous and may have any width, W. The maximum length and/or electrical resistance of the drive and receive electrodes 111, 112 is a function of the height, H, of the touch sensitive area 105. In the embodiments described herein, the touch accuracy of the touch sensitive area is independent of width of the touch sensitive area. In these embodiments, the touch sensitive area 105 has a touch accuracy that is independent of the width of the touch sensitive area 105 and/or is independent of the touch location resolution across the touch sensitive area 105. In some cases, the touch location resolution is substantially uniform over the touch sensitive area 105 and the aspect ratio of the touch sensitive area 105 is greater than 2:1, 3:1, 4:1, or more than 4:1.

Touch location resolution is a function of the pitch period and width of the electrodes. Touch sensitive areas having fine pitch, thin electrodes would have higher resolution than touch sensitive areas that have coarser pitch and/or thicker electrodes. Touch accuracy is a measure of how well the system can detect a particular touch location. It is possible for touch sensitive devices to be highly accurate, but have low resolution, for example. When the pitch of touch electrodes changes across a touch sensitive region or the electrodes are discontinuous across the touch sensitive region, this can lead to non-uniform touch location resolution and/or non-uniform touch location accuracy.

As shown in FIG. 1A, the touch sensitive area 105 includes two opposing edges 106a, 106b along the width, W, of the touch sensitive area (along the x axis indicated in FIG. 1) and two opposing edges 107a, 107b along the height, H, of the touch sensitive area 105 (along the y axis as indicated in FIG. 1A). The drive and receive electrodes 111, 112 can extend continuously from one edge to another edge. In the illustrated embodiment, the drive electrodes extend along a first direction indicated by arrow 111a and the receive electrodes extend along a second direction indicted by arrow 112a. The first direction makes an angle, $\theta_1$, with respect to the height direction (the y axis in FIG. 1A) and the second direction makes an angle, $\theta_2$, with respect to the height direction. In some configurations, $\theta_1$=45 degrees and $\theta_2$=−45 degrees, for example. In various configurations, one or both of the first direction and the second direction forms an acute angle (+/−θ) with respect to the height direction (y-axis) of the touch sensitive area 105. In some cases the first and second directions are orthogonal. However, it is also possible that the first and second directions are non-orthogonal.

Figure 2A:
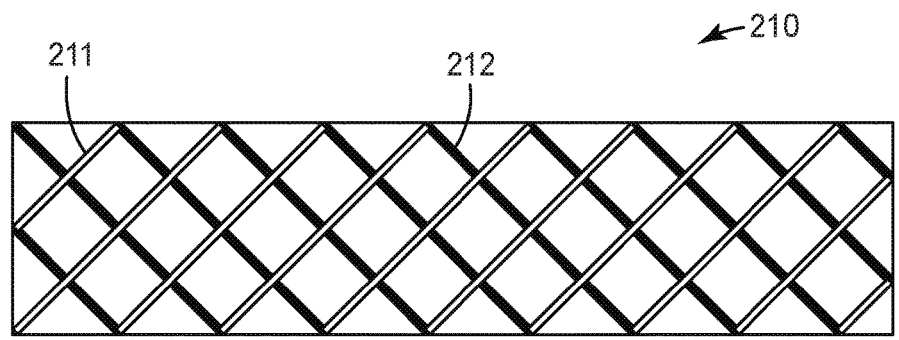
FIGS. 2A-2C show several touch sensitive areas having drive and receive electrode arrangements suitable for wide aspect ratio touch panels in accordance with some embodiments.
Figure 2B:
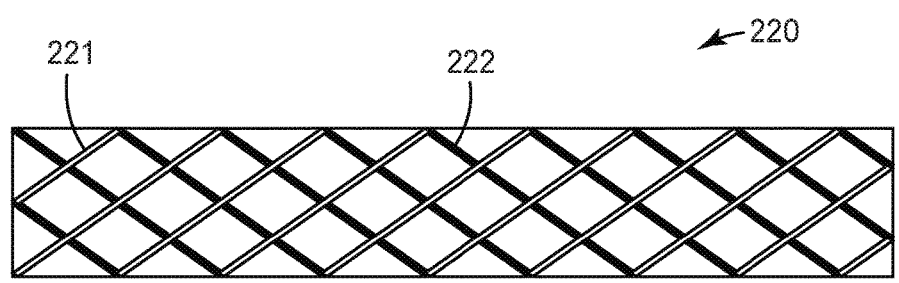
Figure 2C:
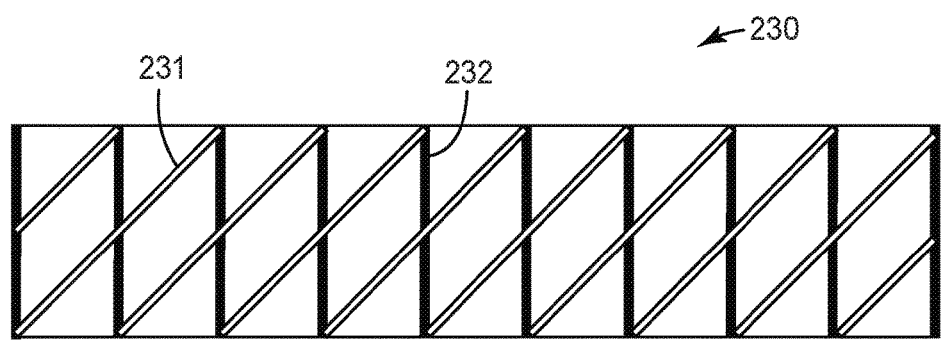

FIGS. 2A-2C show several touch sensitive areas 210, 220, 230 having drive and receive electrode arrangements suitable for wide aspect ratio touch panels in accordance with some embodiments. In FIG. 2A the touch sensitive area 210 includes drive electrodes 211 oriented at an angle of +45 degrees with respect to the height direction (y axis) of the touch sensitive area 210 and receive electrodes 212 oriented at an angles of −45 degrees with respect to the height direction. The drive and receive electrodes 211, 212 are orthogonal. FIG. 2B shows touch sensitive area 220 having drive 221 and receive 222 electrodes oriented non-orthogonally. FIG. 2C shows a touch sensitive area 230 where the drive electrodes 231 are oriented at an angle of +45 degrees with respect to the height direction (y axis) of the touch sensitive area 230. The receive electrodes 232 are oriented substantially parallel to the height direction.

Returning now to FIG. 1A, touch panel 110 includes a border region 130 that extends along at least one of the edges 106a, 106b, 108a, 108b of the touch sensitive area 105. For the rectangular configuration shown in FIG. 1A, the border region 130 is disposed at both edges 108a, 108b along the height direction (y direction) of the touch sensitive area 105 and along one of the width-wise edges 106b. In other configurations, e.g., the cylindrical configuration discussed below, the border region may extend along only one edge. Electrical contacts and/or leads that electrically connect the touch electrodes 111, 112 to the controller 120 are disposed in the border region 130. As shown in FIG. 1A, drive electrode contacts and/or leads 131 may be disposed in the border region 130 along height-wise edge 108a; receive electrode contacts and/or leads 132 may be disposed in the border region 130 along height-wise edge 108b; and interdigitated drive/receive contacts and/or leads 133 may be disposed along the width-wise edge 106b.

The continuous drive and receive electrodes 111, 112 may have similar physical characteristics with regard to width and thickness, and similar electrical resistivity. A majority of the electrodes extend between edges 106a, 106b that run along the width of the touch sensitive area 105. The drive electrodes 111 that extend between edges 106a, 106b along the width of the touch sensitive area 105 can have the same length and/or the same resistance as the receive electrodes that extend between edges 106a, 106b. In some cases majority of the drive electrodes 111 and a majority of the receive electrodes 112 extend between edges width-wise edges 106a, 106b and these drive and receive electrodes 111, 112 have substantially the same length. The drive and receive electrodes that have the same length and extend between width-wise edges 106a, 106b can have the same physical and electrical characteristics, width in the x-y plane, layer thickness in the z direction, material composition, and electrical resistance.

Electrodes proximate to edges 108a, 108b extend between edges 108a, 108b and edges 106a, 106b. As shown in the illustrated configuration, there are no electrodes that extend between height-wise edges 108a, 108b, e.g., parallel to the width-wise direction (x direction in FIG. 1). The drive 111 and receive 112 electrodes traverse each other at a plurality of nodes 113. Each drive electrode 111 traverses at least one, but not all, of the receive electrodes 112, and each receive electrode 112 traverses at least one, but not all, of the drive electrodes 111.

Due in part to the arrangement of electrodes 111, 112, the touch sensitive area 105 can have a width greater than its height, e.g., more than 2, 3, 4, or more times greater, without segmentation of the touch sensitive area 105, e.g., that results in discontinuous electrodes. Electrical resistance of the electrodes is a function of their length. The width of a touch panel with drive or sense electrodes that extend between edges across the width of the touch sensitive area, e.g., parallel or approximately parallel to the major, width-wise direction, is limited by the electrical resistance of the electrodes. To make widescreen touch panels with large aspect ratios (W:H), segmented touch panels have been used. A segmented touch panel can be formed of a number of concatenated touch panels, each touch panel having a touch sensitive area and a surrounding border region. The electrical resistance of the electrodes for a segmented touch panel is a function of the width of the touch sensitive segments. Such segmented touch panels may include 2, 3, 4, or more segments to achieve a specified width.

In a segmented touch panel, border areas separate the touch sensitive area of one touch panel segment from the touch sensitive areas of neighboring touch panel segments. Each border area is used for electrical contacts and/or leads that connect the touch electrodes to control circuitry. Thus, the touch sensitive area of a segmented touch panel is discontinuous due to the presence of the border areas that separate the touch sensitive areas. The border areas of segmented touch panels are insensitive to touch, thus touch accuracy is diminished in the border regions. Furthermore, the border areas of segmented touch panels can cause a change in resolution of the touch sensitive area due to a change in pitch of the touch electrodes across the border areas. In contrast to segmented displays, the touch panels disclosed herein have continuous touch sensitive area and the touch resolution is not affected by the width of the touch sensitive area.

Figure 1B:
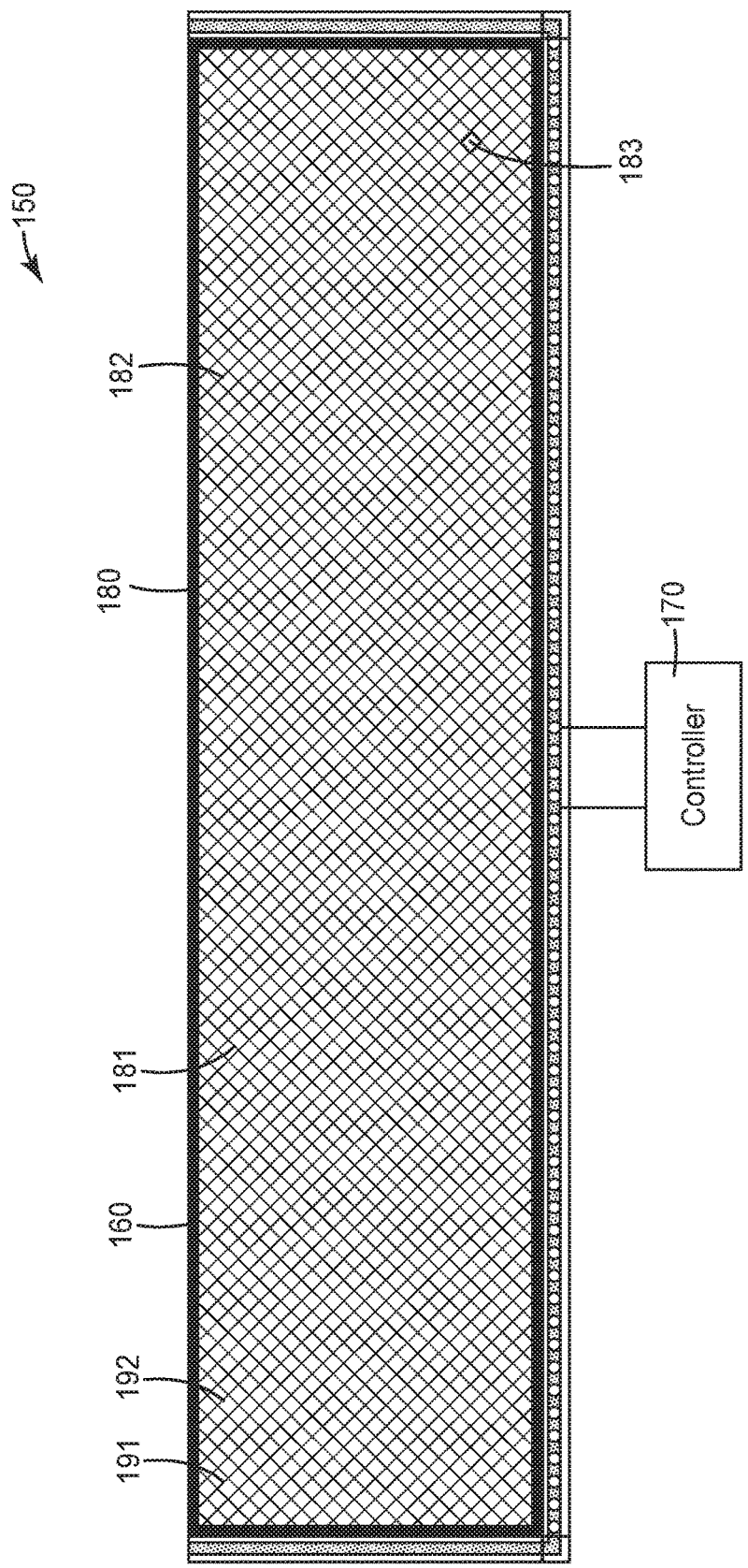
FIG. 1B shows a touch panel having a touch sensitive area with drive and receive electrodes grouped into multiple scan zones.

The drive and receive electrodes may be grouped into multiple simultaneously accessible scan zones to accommodate touch sensing across the width of the touch sensitive area. Touch sensitive system 150 shown in FIG. 1B includes touch panel 160 having a touch sensitive area 180 with drive and receive electrodes 191, 192 grouped into scan zone A 181, scan zone B 182, and scan zone C 183. The scan zones 181, 182, 183 may have different numbers of drive and/or receive electrodes 191, 192, as illustrated in FIG. 1B. In this particular implementation, scan zone A 181 includes more drive and sense electrodes than scan zones B or C 182, 183 and scan zone B includes more drive and sense electrodes than scan zone C 183.

The controller 170 includes at least one drive unit configured to generate drive signals that simultaneously scan each scan zone 181, 182, 183 of the touch sensitive area 180. The controller 170 generates drive signals and applies the drive signals to the drive electrodes 191 in each scan zone 181, 182, 183 one at a time, e.g., through a multiplexer. The drive signals may be or include only one individual drive pulse, a plurality or train of such drive pulses, or may be sinusoidal or have another wave shape.

The receive electrodes 192 are capacitively coupled to the drive electrodes 191, and carry response signals that are responsive to the drive signals. Amplitudes of these response signals are responsive to the coupling capacitance at the associated nodes where the receive electrodes 192 traverse the drive electrodes 191. The controller 170 includes at least one sense unit configured to detect, for each drive signal delivered to each drive electrode 191 in each scan zone, response signals for the plurality of receive electrodes 192 that are capacitively coupled to such drive electrode 191. The controller 170 includes at least one analyzer configured to determine from the response signals the positions of a single touch, multiple temporally overlapping touches, and/ or one or more moving touches, if present, on the touch surface.

Figure 3:
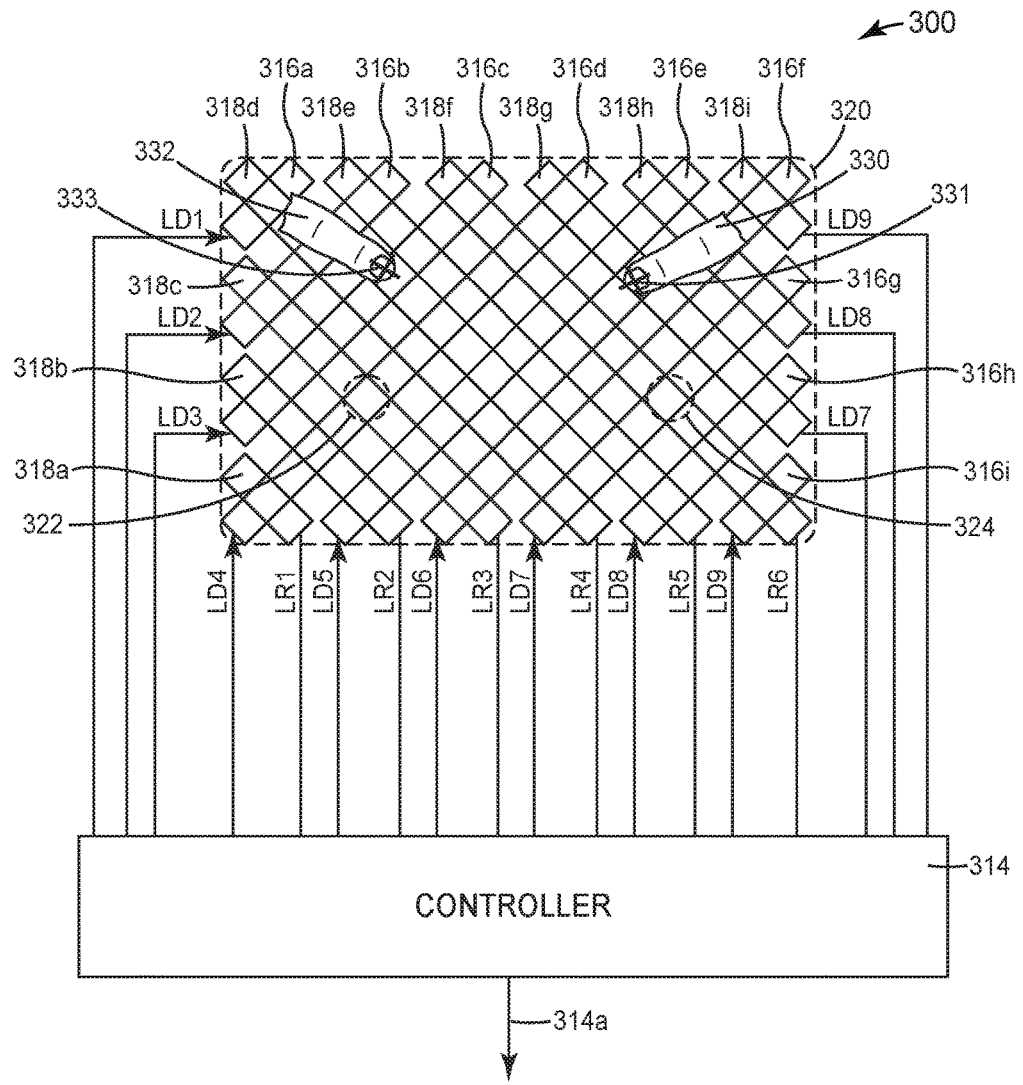
FIG. 3 depicts a schematic view of a touch sensitive system.

Operation of the touch sensitive system is described in more detail with reference to FIG. 3. Touch sensitive system 300 includes a touch panel 312 connected to electronic circuitry that forms a touch panel controller which for simplicity is grouped together into a single schematic box labeled 314 and referred to collectively as a controller.

The touch panel 312 is shown as having nine drive electrodes 316a-i and nine receive electrodes 318a-i, but other numbers of electrodes and/or other matrix sizes can also be used. The panel 312 is typically substantially transparent so that the user is able to view an object, such as the pixilated display of a computer, hand-held device, mobile phone, or other peripheral device, through the panel 312.

A dashed line indicates a portion of a continuous touch sensitive area 320 of the panel 312 and also a portion of the viewing area of such a display, if used. The first 316a-i and second 318a-i electrodes are spatially distributed, from a plan view perspective, over the portion of the touch sensitive area 320. For ease of illustration the electrodes are shown to be wide and obtrusive, but in practice they may be relatively narrow and inconspicuous to the user. In FIG. 3, for simplicity only a portion of the continuous touch sensitive area 320 is shown, in most cases, the touch sensitive area 320 would include additional electrodes. The electrodes 316a-i, 318a-i extend continuously across the touch sensitive area 320 wherein each first electrode 316a-i traverses one, but not all, of the second electrodes 318a-i, and each second electrode 318a-i traverses one, but not all, of the first electrodes 316a-i. Further, first and second electrodes 316a-i, 318a-i may be designed to have variable widths, e.g., an increased width in the form of a diamond- or other-shaped pad in the vicinity of the nodes of the matrix in order to increase the inter-electrode fringe field and thereby increase the effect of a touch on the electrode-to-electrode capacitive coupling. In some embodiments the electrodes may be composed of indium tin oxide (ITO) or other suitable electrically conductive materials.

From a depth perspective, the first electrodes 316a-i may lie in a different plane than the second electrodes 318a-i such that no significant ohmic contact is made between first and second electrodes, and so that the only significant electrical coupling between a given first electrode and a given second electrode is capacitive coupling. The electrodes 316a-i, 318a-i typically lie beneath a cover glass, plastic film, or the like, so that the electrodes 316a-i, 318a-i are protected from direct physical contact with a user's finger or other touch-related implement. An exposed surface of such a cover glass, film, or the like may be referred to as a touch surface.

Additionally, in display-type applications, a back shield may be placed between the display and the touch panel 312. Such a back shield typically consists of a conductive ITO coating on a glass or film, and can be grounded or driven with a waveform that reduces signal coupling into touch panel 312 from external electrical interference sources. Other approaches to back shielding are known in the art. In general, a back shield reduces noise sensed by touch panel 312, which in some embodiments may provide improved touch sensitivity (e.g., ability to sense a lighter touch) and faster response time. Back shields are sometimes used in conjunction with other noise reduction approaches, including spacing apart touch panel 312 and a display, as noise strength from liquid crystal displays (LCDs), for example, rapidly decreases over distance. In addition to, or as an alternative to, these techniques, other approaches to dealing with noise problems are possible.

The capacitive coupling between a given first 316a-i and second 318a-i electrodes is primarily a function of the geometry of the electrodes in the region where the electrodes traverse each other and are closest together. Such regions correspond to the nodes 322, 324 of the electrode matrix, some of which are labeled in FIG. 3. For example, capacitive coupling between first electrode 316c and second electrode 318c occurs primarily at node 322, and capacitive coupling between first electrode 316g and second electrode 318e occurs primarily at node 324. The touch sensitive area of FIG. 3 has 39 such nodes, any one of which can be addressed by controller 314 via appropriate selection of one of the first lines LD1-9, which individually couple the respective first electrodes 316a-i to the controller 314, and appropriate selection of one of the second lines LR1-9, which individually couple the respective second electrodes 318a-i to the controller 314.

When a finger 330 of a user or other touch implement comes into contact or near-contact with the touch sensitive area 320, as shown at touch location 331, the finger 330 capacitively couples to a region of the touch sensitive area 320. The finger draws charge from the touch sensitive area 320, particularly from those electrodes lying closest to the touch location, and in doing so it changes the coupling capacitance between the electrodes corresponding to the nearest node(s).

For example, the touch at touch location 331 lies nearest the node corresponding to electrodes 316f and 318g. As described further below, this change in coupling capacitance can be detected by controller 314 and interpreted as a touch at or near the 316f/318g node. The controller 314 is configured to detect the change in capacitance, if any, of all of the nodes by scanning through the electrodes of the touch sensitive area 320, which may be arranged in multiple zones for simultaneous scanning. The controller 314 is capable of analyzing the magnitudes of capacitance changes for neighboring nodes so as to accurately determine a touch location lying between nodes by interpolation. Furthermore, the controller 314 can be designed to detect multiple distinct touches applied to different portions of the touch sensitive area 320 at the same time, or at overlapping times. Thus, for example, if another finger 332 touches the touch sensitive area 320 at touch location 333 simultaneously with the touch of finger 330, or if the respective touches at least temporally overlap, the controller 314 can be designed to be capable of detecting the positions 331, 333 of both such touches and providing such locations on a touch output 314a. The controller 314 can be configured to detect more than 2 distinct simultaneous or temporally overlapping touches e.g., 3, 4, or more, depending on the size of the touch sensitive area 320.

As discussed further below, the controller 314 employs a variety of circuit modules and components that enable it to rapidly determine the coupling capacitance at some or all of the nodes of the electrode matrix. For example, the controller includes at least one signal generator or drive unit. The drive unit can be configured to deliver drive signals simultaneously to drive electrodes in multiple zones as discussed in connection with FIG. 1B. In the embodiment of FIG. 3, the first electrodes 316a-i are used as drive electrodes although the second electrodes 318a-i could alternatively be used. The drive signals are delivered to one drive electrode at a time in each zone, e.g., in a scanned sequence from a first to a last drive electrode in the zone. As each such electrode is driven, the controller 314 monitors the second electrodes 318a-i, referred to as receive electrodes. The controller 314 may include one or more sense units coupled to the receive electrodes 318a-i. For each drive signal that is delivered to each drive electrode in a zone, the sense unit(s) generate response signals for the plurality of receive electrodes in the zone.

In some embodiments, the sense unit(s) are designed such that each response signal comprises a differentiated representation of the drive signal. For example, if the drive signal is represented by a function f(t), which may represent voltage as a function of time, then the response signal may be or comprise, at least approximately, a function g(t), where $g(t)=d\ f(t)/dt$. In other words, g(t) is the derivative with respect to time of the drive signal f(t). Depending on the design details of the circuitry used in the controller 314, the response signal may include: (1) g(t) alone; or (2) g(t) with a constant offset (g(t)+a); or (3) g(t) with a multiplicative scaling factor (b*g(t)), the scaling factor capable of being positive or negative, and capable of having a magnitude greater than 1, or less than 1 but greater than 0; or (4) combinations thereof, for example. In any case, an amplitude of the response signal is related to the coupling capacitance between the drive electrode being driven and the particular receive electrode being monitored. The amplitude of g(t) is also proportional to the amplitude of the original function f(t). Note that the amplitude of g(t) can be determined for a given node using only a single pulse of a drive signal, if desired.

The controller 314 may also include circuitry to identify the amplitude of the response signal. Exemplary circuit devices for this purpose may include one or more peak detectors, sample/hold buffer, and/or low-pass filter, the selection of which may depend on the nature of the drive signal and the corresponding response signal. The controller 314 may also include one or more analog-to-digital converters (ADCs) to convert an analog amplitude to a digital format. One or more multiplexers may also be used to avoid unnecessary duplication of circuit elements. The controller can include one or more memory devices in which to store the measured amplitudes and associated parameters, and a microprocessor to perform the necessary calculations and control functions.

By measuring an amplitude of the response signal for each of the nodes of the touch sensitive area 320, the controller 314 can generate a matrix of measured values related to the coupling capacitances for each of the nodes of the touch sensitive area 320. These measured values can be compared to a similar matrix of previously obtained reference values in order to determine which nodes, if any, have experienced a change in coupling capacitance due to the presence of a touch.

Figure 4:
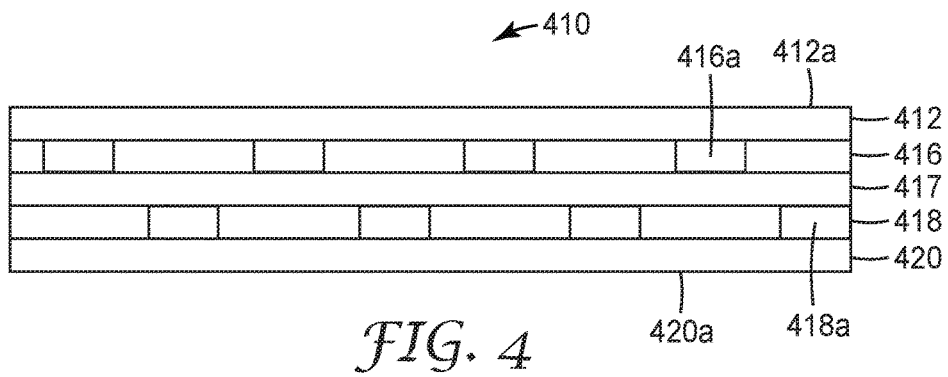
FIG. 4 depicts a schematic side view of a touch panel.

FIG. 4 shows a schematic side view of a portion of a touch panel 410 suitable use in a touch sensitive system in accordance with embodiments described herein. The panel 410 includes a front layer 412, first electrode layer 416 comprising a first set of electrodes 416a, insulating layer 417, second electrode layer 418 comprising a second set of electrodes 418a, and a rear layer 420. The exposed surface 412a of layer 412, or the exposed surface 420a of layer 420, may be or comprise the touch surface of the touch panel 410.

Figure 5:
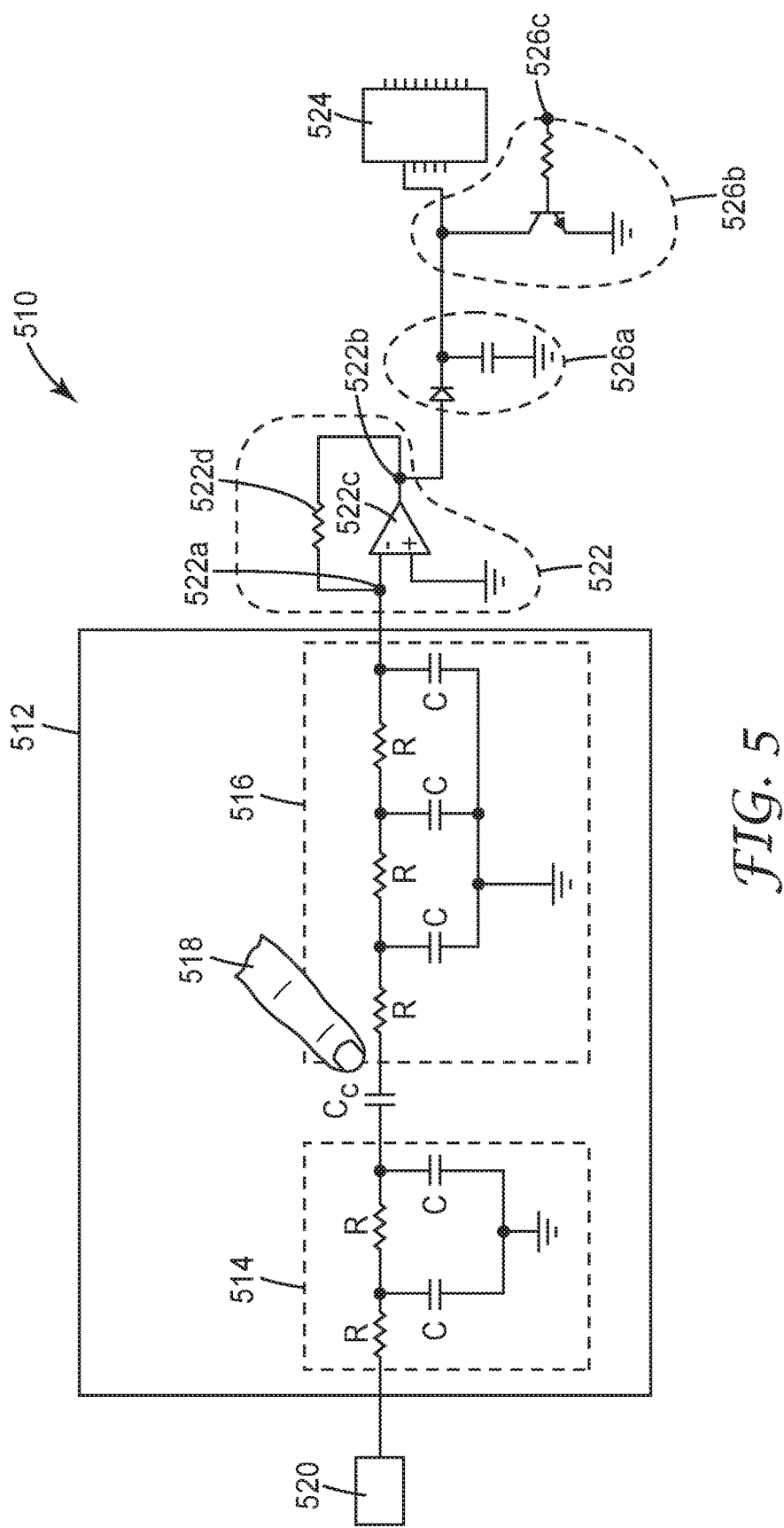
FIG. 5 is an electrical schematic of a portion of a touch sensitive system in which relevant drive and sense circuitry is shown in the context of one drive electrode and one receive electrode capacitively coupled thereto.

FIG. 5 further illustrates operations involved in sensing response signals that change in the presence of a touch. FIG. 5 depicts a touch sensitive system 510 in which controller circuitry, such as drive and sense circuitry, is shown in the context of a touch panel 512 having one drive electrode 514 and one receive electrode 516 capacitively coupled thereto via coupling capacitance Cc. The reader will understand that this is a generalization of a touch panel in which drive electrode 514 may be one of a plurality of drive electrodes, and receive electrode 516 likewise may be one of a plurality of receive electrodes, arranged in a touch sensitive area as described, for example, in connection with FIG. 1A.

The drive electrode 514 and receive electrode 516 of FIG. 5, which are depicted by their electrical characteristics (in the form of lumped circuit element models) rather than by their physical characteristics. In this example, the series resistances R shown in the lumped circuit models may each have values of about 75 K ohms, and the stray capacitances C shown in the lumped circuit models may each have values of 20 picofarads (pf), but of course these values are not to be taken as limiting in any way. In this example the coupling capacitance $C_c$ is nominally 2 pf, and the presence of a touch by a user's finger 518 at the node between electrodes 514, 516 causes the coupling capacitance $C_c$ to drop by about 25%, to a value of about 1 pf. Again, these values are not to be taken as limiting.

In accordance with the controller described earlier, the touch sensitive system 510 uses circuitry to interrogate the panel 512 so as to determine the coupling capacitance $C_c$ at each of the nodes of the panel 512. In this regard, the reader will understand that the controller may determine the coupling capacitance by determining the value of a parameter that is indicative of, or responsive to, the coupling capacitance, e.g., an amplitude of a response signal as mentioned above and described further below. To accomplish this task, the touch sensitive system 510 may include a low impedance drive unit 520 coupled to the drive electrode 514 and configured to deliver a drive signal to the drive electrode. To facilitate scanning multiple zones, multiple drive units may be used, e.g., one drive unit per zone. A sense unit 522 is coupled to the receive electrode 516, which, in combination with the coupling capacitance, performs a differentiation on the drive signal supplied by the drive unit 520. In some embodiments, multiple sense units are used for each zone to allow simultaneous sensing from multiple receive electrodes in a zone. An analog-to-digital converter (ADC) unit 524 is coupled to the sense and is configured to convert an amplitude of the response signal generated by the sense unit 522 into a digital format. Depending on the nature of the drive signal supplied by the drive unit 520 (and hence also on the nature of the response signal generated by the sense unit 522), the touch sensitive system 510 may also include a peak detection circuit 526a which in this embodiment also serves as a sample/hold buffer, and an associated reset circuit 526b operable to reset the peak detector. It will be appreciated that in some embodiments the control circuitry includes a set of the circuit components 520 522, 526a, 526b, and 524 for each zone. In some embodiments, one or more of circuit components 522, 526a, 526b, and 524 may be duplicated for some or for each receive electrode of a zone to allow for simultaneous sensing of receive signals during the zone scanning.

In many applications the touch sensitive system 510 will include multiplexers (e.g., at least one multiplexer per zone) between the signal generator 520 and the touch panel 512. The multiplexer(s) for a particular zone provide the capability of addressing any one of a plurality of drive electrodes in the particular zone at a given time. The zone multiplexers together provide the capability of simultaneously addressing a drive electrode in each zone and the drive signal is scanned through multiple zones. The zone scanning may be performed synchronously using a common clock signal.

The touch sensitive system 510 may include multiplexers between one or more sense units 522 of a zone (or between one or more optional sample and hold circuits 526b of a zone) and the ADC unit 524 of the zone, to allow a single ADC unit per zone to rapidly sample the amplitudes associated with multiple receive electrodes of the zone. Embodiments that include a single ADC per zone, avoid the expense of requiring one ADC unit for each receive electrode.

The drive unit 520 preferably is or includes a voltage source with an internal impedance that is preferably low enough to maintain good signal integrity, reduce injected noise, and/or maintain fast signal rise and fall times. The drive unit 520 provides a time-varying drive signal at an output thereof to the drive electrode 514. The drive signal may consist essentially of a single, isolated pulse, or it may comprise a plurality of such pulses or a train of pulses that form a continuous AC waveform, or waveform packet, such as a sinusoidal wave, a square wave, a triangle wave, and so forth. In this regard, the term "pulse" is used in a broad sense to refer to a distinctive signal variation and is not limited to a rectangular shape of short duration and high amplitude. If rapid detection of touch(es) on the touch panel is desired, the drive signal preferably includes only the smallest number of pulses necessary to obtain a reliable measurement of the coupling capacitance at a given node. This becomes particularly important for touch panels that have large electrode matrices, i.e., a large number of nodes to sense. The peak or maximum amplitude of the drive pulse(s) is preferably relatively high, e.g., from 3 to 20 volts, to provide good signal-to-noise ratios. Though shown in FIG. 5 as driving electrode 514 from only one end, in some embodiments, drive unit 520 may be configured to drive electrode 514 from both of its ends. This may be useful, for example, when electrode 514 has high resistance and thus increased drive signal attenuation and susceptibility to noise contamination.

There may be a distinction between the drive signal provided at the output of drive unit 520, and the drive signal being delivered to a particular drive electrode 514. The distinction becomes important when, for example, a multiplexer or other switching device is placed between the drive unit 520 and the touch panel 512 in order to selectively couple the drive unit to a plurality of drive electrodes in a zone, e.g., one at a time. In such a case, the drive unit 520 may have at its output a continuous AC waveform, such as square wave, triangle wave, or the like, yet by virtue of the switching action of the multiplexer, only one pulse of such a waveform, or only a few pulses, may be delivered to any given drive electrode at a time. For example, one pulse of a continuous AC waveform may be delivered to a first drive electrode in the zone, the next pulse of the AC waveform may be delivered to the next drive electrode in the zone, and so on until all drive electrodes in the zone have been driven, whereupon the next pulse of the AC waveform is delivered again to the first drive electrode of the zone and so forth in a repeating cycle. Examples of useable pulse shapes include rectangle pulses, ramped pulses (whether symmetric or asymmetric), and sine wave (e.g., bell-shaped) pulses.

The drive unit 520 may if desired be programmable to provide different pulses at different times. For example, if the drive unit is coupled to a plurality of drive electrodes through a multiplexer, the drive unit may be programmed to provide different signal levels for different drive electrodes to compensate for electrode-to-electrode variations in line resistance and stray capacitance. For example, a drive electrode disposed at a position in a zone that requires a longer conduction length through the receive electrode(s) is beneficially driven with a higher amplitude drive signal than a drive electrode disposed at a position in the zone that requires a shorter conduction length, so as to compensate for losses associated with the receive electrodes. Providing different drive signal levels for different drive electrodes allows one drive signal per zone to be adjusted by a selected amount, with drive signals delivered to different drive electrodes being adjusted by differing amounts as appropriate.

The drive signal provided to the drive electrode 514 is capacitively coupled to receive electrode 516 via the coupling capacitance $C_c$, the receive electrode in turn being connected to sense unit 522. The sense unit 522 thus receives at an input thereof 522a the drive signal (as transmitted by the electrodes 514, 516 and coupling capacitance $C_c$), and generates therefrom a response signal at an output 522b. In some embodiments, the sense unit 522 is designed so that the response signal includes a differentiated representation of the drive signal, an amplitude of which is responsive to the coupling capacitance $C_c$. In some embodiments, the response signal generated by the sense unit includes in some form at least an approximation of the derivative with respect to time of the drive signal. For example, the response signal may include the time derivative of the drive signal, or a version of such signal that is inverted, amplified (including amplification less than 1), offset in voltage or amplitude, and/or offset in time, for example. To repeat from the earlier discussion, if the drive signal delivered to the drive electrode is represented by a function f(t), then the response signal may be or comprise, at least approximately, a function g(t), where g(t)=d f(t)/dt.

An exemplary circuit to perform such function is shown in FIG. 5. The input to such circuit, shown at 522a, is the inverting input (−) of an operational amplifier 522c. The other input of the op amp, a non-inverting input (+), is set to a common reference level that can be optimized for maximum signal range. In FIG. 5, this reference level is shown as ground potential for simplicity, but non-zero offset voltages can also be used. A feedback resistor 522d is connected between the output of the op amp at 522b and the inverting input. When connected in this way, the inverting input of the op amp 522c, i.e., the input 522a, is maintained as a virtual ground summing point, and no signal is observed at that point. This also means that the receive electrode 516 is maintained at a constant voltage substantially equal to the voltage at which the non-inverting input of the op amp is held. The feedback resistor 522d can be selected to maximize signal level while keeping signal distortion low, and can be otherwise set or adjusted as described herein.

The op amp 522c connected in this fashion, in combination with the coupling capacitance $C_c$, has the effect of producing a differentiated representation of the drive signal that is delivered to drive electrode 514. In particular, the current I flowing through the feedback resistor 522d at any given time is given by:

$$I \approx C_c * dV/dt,$$

where $C_c$ is the coupling capacitance, V represents the time-varying drive signal delivered to the drive electrode, and dV/dt is the derivative with respect to time of V. Although this equation is nominally correct, the reader will understand that it does not take into account various second order effects caused by, for example, parasitic resistance and capacitance of the electrodes being used, op amp characteristics and limitations, and the like, which can affect both the magnitude and the dynamic response of the current I. Nevertheless, the current I, flowing through the feedback resistor, produces a voltage signal at the output 522b which corresponds to the response signal discussed above. Due to the direction of current flow through the feedback resistor, this response signal is inverted insofar as a positive dV/dt (V increases with time) produces a negative voltage at output 522b, and a negative dV/dt (V decreases with time) produces a positive voltage at output 522b, with a specific example given below in connection with FIG. 6. This can be expressed as:

$$V_{RS} \approx -R_f * C_c * dV/dt,$$

where $V_{RS}$ represents the response signal voltage at the output 522b at any given time, and $R_f$ is the resistance of feedback resistor 522d. Note that the amplitude (voltage) of the response signal is nominally proportional to the coupling capacitance $C_c$. Thus, since a touch at the node of the electrodes 514, 516 reduces the coupling capacitance $C_c$, a measure of the peak amplitude or other characteristic amplitude of the response signal provided by sense unit 522 can be analyzed to determine the presence of a touch at that node.

As previously mentioned, in embodiments in which receive electrode 516 is one of a plurality of receive electrodes in a zone, it may be desirable to include a dedicated sense unit 522 for each receive electrode in the zone. Further, it may be advantageous to provide different amounts of amplification (e.g., different feedback resistor values for the different op amps) for the different sense units to compensate for signal losses in the touch screen that are different for different drive electrodes. For example, a receive electrode disposed at a position that requires a long conduction length through the drive electrode(s) is beneficially provided with a greater amplification than a receive electrode disposed at a position that requires a shorter conduction length, so as to compensate for losses associated with the drive electrodes. Providing different amounts of amplification for different receive electrodes of a zone in this way is particularly advantageous for larger zones, because it can reduce the need to program a large number of detection circuits (corresponding to the number of receive electrodes) for losses in the touch panel.

As mentioned above, touch sensitive system 510 may also include peak detection circuit 526a which in this embodiment also serves as a sample/hold buffer, and an associated reset circuit 526b operable to reset the peak detector. These circuit elements can be used in cases where the peak amplitude of the response signal generated by the sense unit 522 is to be used as a measure of the coupling capacitance $C_c$. Such cases can include embodiments in which the response signal provided by the sense unit 522 is highly transient, e.g., in cases where one or more rectangle pulses are used for the drive signal. In such cases, the peak detector 526a operates to maintain the peak amplitude of the response signal for a relatively long time to allow reliable sampling and conversion to a digital value by the ADC 524. In some embodiments, a single ADC for a zone may be cyclically coupled to the detection circuitry of each receive electrode for that zone, requiring each detection circuit to maintain the measurement voltage for an extended period of time. After the measurement is made by the ADC 524, the peak detector can be reset by operation of reset circuit 526*b* so that a new peak value can be measured in a subsequent cycle.

The operation of the diode/capacitor combination depicted for peak detector 526*a*, serves to maintain the peak voltage for an extended period without discharging the capacitor through the sense unit 522. The operation of the reset circuit 526*b*, responding to a suitable reset control signal provided at contact 526*c*, serves to reset the peak detector 526*a* to its nominal value. Note that other known electronic devices capable of carrying out one or more functions of the described sense unit, peak detector, sample/hold buffer, and/or reset circuit, whether in hardware, software, or combinations thereof, are fully contemplated herein.

As mentioned previously, the ADC 524 is provided to convert the amplitude value associated with the response signal to a digital format for use with digital components such as a microprocessor for further processing. The ADC may be of any suitable design, e.g., it may comprise a high speed successive approximation register (SAR) and/or a sigma-delta type converter.

With regard to further processing of the measured amplitude value of a given node, the measured amplitude value can be stored in a memory register. If desired, multiple such values associated with the given node may be stored and averaged, e.g. for noise reduction purposes. Furthermore, the measured amplitude value is preferably compared to a reference value in order to determine if a reduction of the coupling capacitance has occurred, i.e., if some amount of touch is present at the given node. Such comparison may involve subtraction of the measured value from the reference value, for example. In embodiments involving a large touch matrix containing many nodes, the measured values for all of the nodes can be stored in memory, and individually compared to respective reference values in order to determine if some amount of touch is present at each node. By analyzing the comparison data, the positions of multiple temporally overlapping touches, if present on the touch surface, can be determined. The number of temporally overlapping touches capable of being detected may be limited only by the dimensions of the touch sensitive area of the touch panel and the speed of the drive/detection circuitry. In exemplary embodiments, interpolation is performed for differences detected for neighboring nodes so as to accurately determine a touch location lying between nodes.

Figure 6:
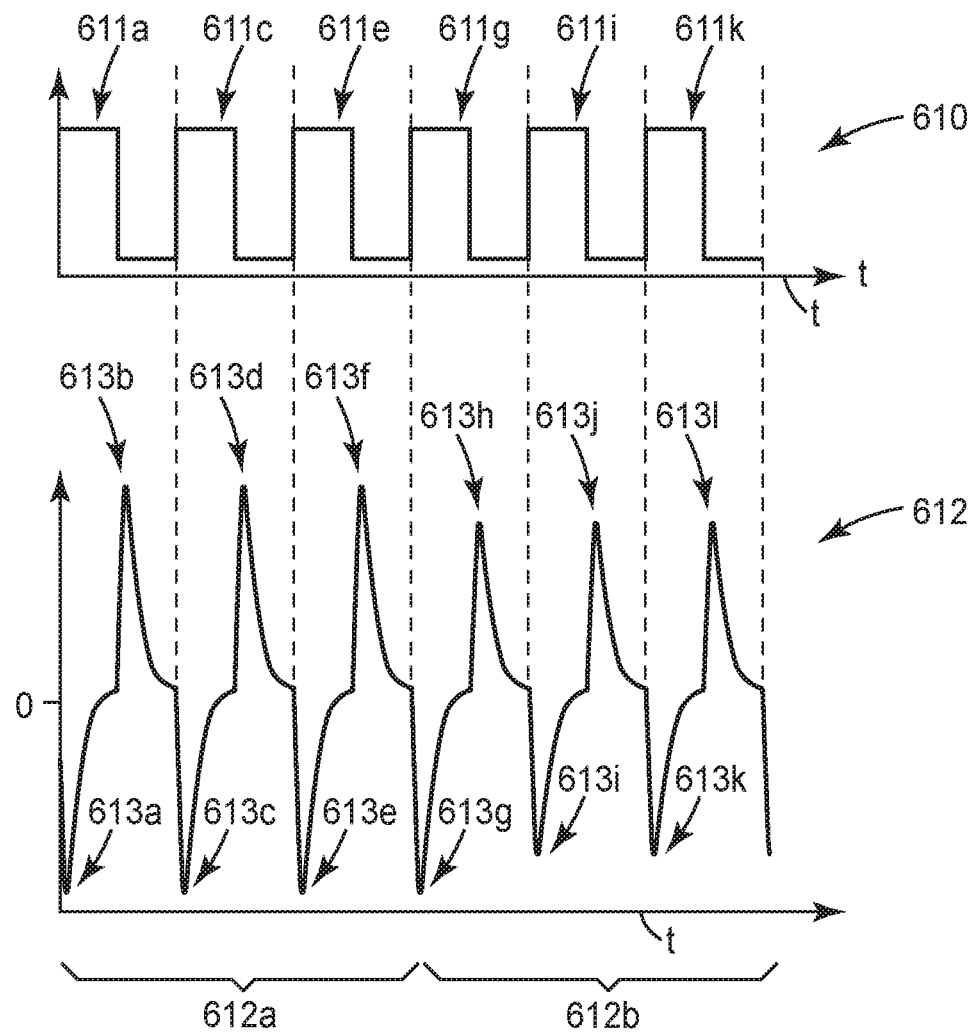
FIG. 6 is a graph of a drive signal and a corresponding (modeled) response signal for the touch sensitive system of FIG. 5.

FIG. 6 depicts a voltage vs. time graph of a particular drive signal 610 and a corresponding voltage vs. time graph of a (modeled) response signal 612 generated by a sense unit of the type depicted in FIG. 5. For purposes of the model, the electronic characteristics of the drive electrode, receive electrode, and coupling capacitance (including the effect of a touch thereon, i.e., decreasing the capacitance from 2.0 pf to 1.5 pf) were assumed to be as described above in connection with the representative embodiment of FIG. 5. Furthermore, the feedback resistor 522*d* for the op amp 522*c* was assumed to be on the order of 2M ohms.

The drive signal 610 is seen to be a square wave, containing a series of rectangle pulses 611*a*, 611*c*, 611*e*, . . . 611*k*. This entire signal was assumed to be delivered to a particular drive electrode, although in many embodiments a smaller number of pulses, e.g. only one or two, may be delivered to a given drive electrode at a given time, after which one or more pulses may be delivered to a different drive electrode, and so on. The response signal 612 generated by the sense unit is seen to comprise a plurality of impulse pulses 613*a-l*, two for each rectangle pulse 611*a*, as one would expect for a differentiated square wave. Thus, for example, the drive pulse 611*a* yields a negative-going impulse pulse 613*a* associated with the positive-going transition (left side) of the rectangle pulse, and a positive-going impulse pulse 613*b* associated with the negative-going transition (right side) of the rectangle pulse. The impulse pulses are rounded as a result of the op amp signal bandwidth and the RC filter effects of the touch screen. Despite these deviations from an ideal derivative with respect to time of signal 610, the response signal 612 can be considered to comprise a differentiated representation of the drive signal.

As shown, the drive pulses 611*a*, 611*c*, 611*e*, . . . 611*k*, all have the same amplitude, although pulses of differing amplitude can also be delivered as explained above. However, despite the common amplitude of the drive pulses, the impulse pulses 613*a-g* occurring in the time period 612*a* are seen to have a first peak amplitude, and impulse pulses 613*h-l* occurring in the time period 612*b* are seen to have a second peak amplitude less than the first peak amplitude. This is because the model introduced a change in coupling capacitance $C_c$ at a point in time after impulse pulse 613*g* and before impulse pulse 613*h*, the change corresponding to a transition from a non-touch condition ($C_c$=2 pf) to a touch condition ($C_c$=1.5 pf). The reduced peak amplitude of the impulse pulses during time period 612*b* can be readily measured and associated with a touch event at the applicable node.

The transient nature of the impulse pulses 613*a-l* make them particularly suited for use with a peak detector and sample/hold buffer as described in connection with FIG. 5, so that an accurate measurement of the peak amplitude can be obtained and sampled by the ADC. Although the operation of touch sensing has been described in terms of square wave drive signals, it will be appreciated that other signal wave shapes can alternatively be used for the drive signal, e.g., triangle waves, sawtooth waves etc.

Figure 7A:
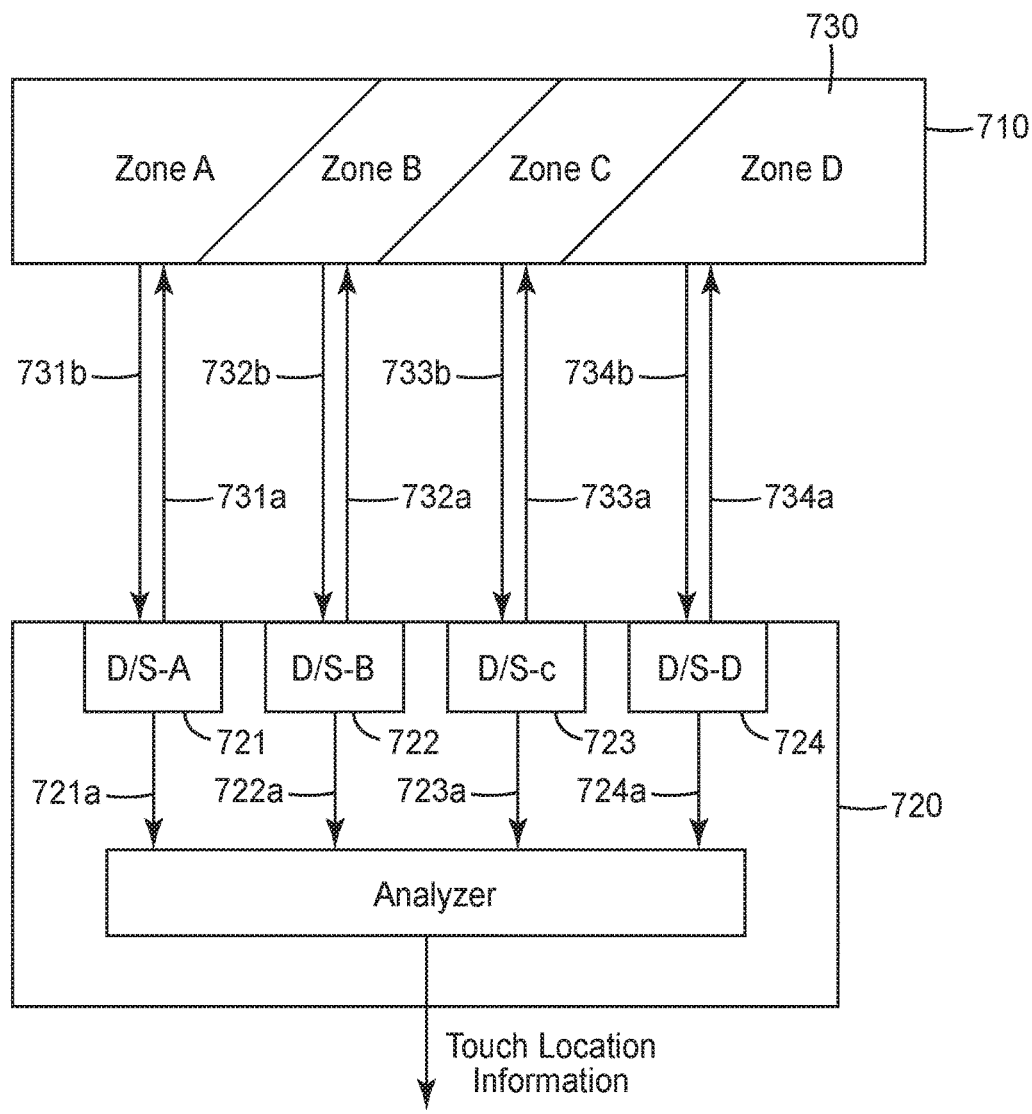
FIG. 7A is a block diagram of a touch sensitive system having a wide aspect ratio touch panel divided into multiple scan zones and a controller with multiple associated drive and sense units and an analyzer unit.

As previously discussed, touch sensitive systems as described herein are particularly suited to provide touch sensitive areas with aspect ratios greater than 2:1. These wide touch panels can be divided into zones that are simultaneously scanned by the controller. The response signals from each zone can be output to a touch location analyzer to determine touch locations. FIG. 7A illustrates a touch sensitive system 700 comprising a touch panel 710 and controller 720 having a central analyzer 725 that provides touch location information. Touch panel 710 includes a touch sensitive area 730 divided into multiple scan zones A-D. To facilitate scanning multiple zones, multiple drive and sense units 721, 722, 723, 724 may be used, e.g., one drive/sense unit per zone. In this embodiment, the controller 720 includes drive and sense units 721, 722, 723, 724 respectively associated with scan zones A-D. Each of the drive and sense units 721, 722, 723, 724 can include a low impedance drive unit (e.g., see 520 of FIG. 5) coupled to the drive electrodes of the associated zone and configured to deliver drive signals 731*a*, 732*a*, 733*a*, 734*a* to the drive electrodes in each zone. The drive units 721, 722, 723, 724 can simultaneously scan the drive electrodes of zones A-D, e.g., one drive electrode per zone at a time.

Each of the drive and sense units 721, 722, 723, 724 can include a sense unit (e.g., see 522 of FIG. 5) coupled to the receive electrodes of the associated zone and configured to provide response signals 731*b*, 732*b*, 733*b*, 734*b* from the receive electrodes in each zone.

A sense unit (e.g., see 522 of FIG. 5) is coupled to the receive electrodes of the zone, which, in combination with the coupling capacitance, performs a differentiation on the drive signal supplied by the drive units. An ADC unit is coupled to the sense unit and is configured to convert an amplitude of the response signal generated by the sense unit into a digital format. In some implementations, the drive and sense units may also include one or more peak detection circuit (e.g., 526a of FIG. 5) that may also serve as a sample/hold buffer, and associated reset circuit (e.g., 526b of FIG. 5) operable to reset the peak detector. In some embodiments, each of the drive and sense units 721, 722, 723, 724 may include multiple sense units, multiple peak detection circuits and multiple reset circuits are used to allow simultaneous sensing from multiple receive electrodes in a zone. In very high speed applications, multiple ADCs may be used for each zone.

The output signals 721a, 722a, 723a, 724a from the drive sense units 721, 722, 723, 724 (e.g., digital output from ADC 524 of FIG. 5) are received by a central touch analyzer 725. In some embodiments, the output signals 721a, 722a, 723a, 724a comprise digital data that is transferred via a high speed communications link, such as an Ethernet link. The touch analyzer 725 analyzes the signals to determine touch locations, e.g. by comparing amplitude information contained in the output signals 721a, 722a, 723a, 724a to known or previously received output signals.

In some scenarios a static touch may span two zones of the touch sensitive area. It is also possible for a moving touch to span multiple zones of the touch sensitive area. The analyzer 725, which receives information from all drive and sense units 721, 722, 723, 724, can resolve these situations and determine touch locations for touches that span zones, and/or moving touches that span zones, by analyzing the signals 721a, 722a, 723a, 724a from each of the drive and sense units 721, 722, 723, 724. For example, the analyzer 725 can implement an aggregator function, as discussed in below in connection with FIG. 7B, that aggregates information from the drive and sense units 721, 722, 723, 724 to provide global touch information across the zones.

Figure 7B:
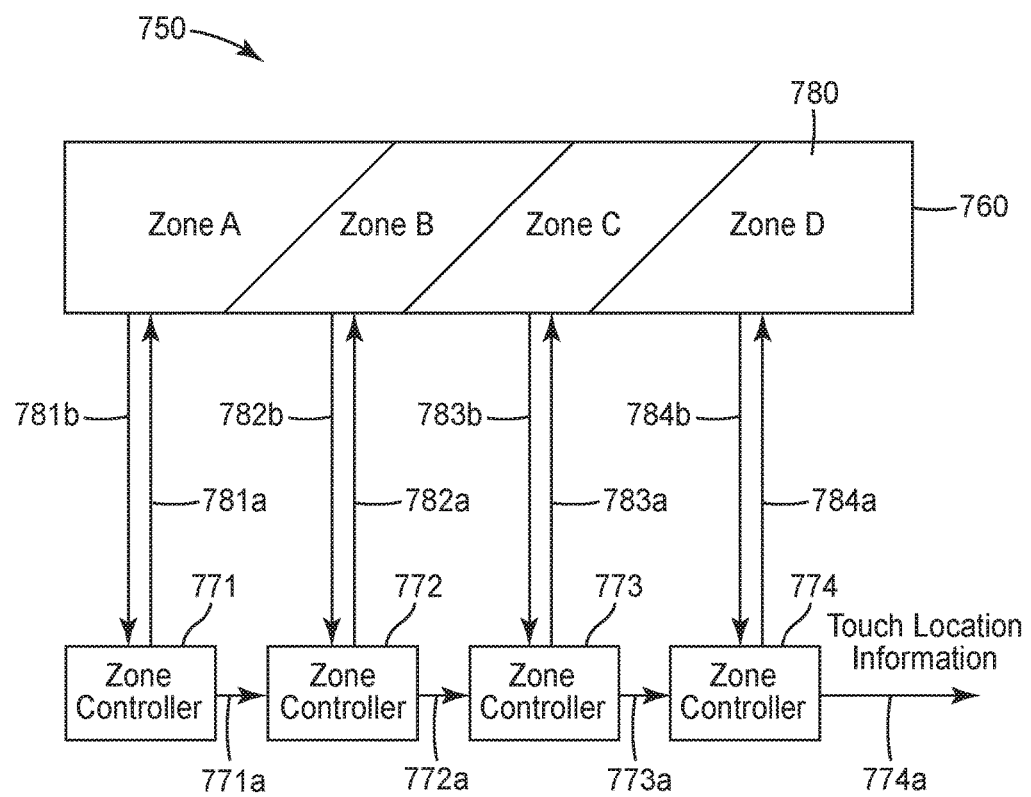
FIG. 7B is a block diagram of a touch sensitive system having a wide aspect ratio touch panel with multiple scan zones, each scan zone associated with a distributed zone controller.

FIG. 7B illustrates another configuration of a touch sensitive system 750 comprising a touch panel 760 and distributed zone controllers 771, 772, 773, 774 that cooperate to provide touch location information. Touch panel 760 includes a touch sensitive area 780 divided into multiple scan zones A-D. Zone controllers 771, 772, 773, 774 are respectively associated with scan zones A-D of the touch sensitive area 780. To facilitate scanning zones A-D, each zone controller 771, 772, 773, 774 includes a drive and sense unit.

The drive and sense unit of each zone controller 771, 772, 773, 774 includes a low impedance drive unit (e.g., see 520 of FIG. 5) coupled to the drive electrodes of the associated zone and configured to deliver drive signals 781a, 782a, 783a, 784a to the drive electrodes in the associated zone. The drive units of the zone controllers 771, 772, 773, 774 can simultaneously scan the drive electrodes of zones A-D, e.g., one drive electrode per zone at a time.

Each of the zone controllers 771, 772, 773, 774 includes a sense unit (e.g., see 522 of FIG. 5) coupled to the receive electrodes of the associated zone and configured to provide response signals 781b, 782b, 783b, 784b from the receive electrodes in the associated zone A-D.

The sense unit (e.g., see 522 of FIG. 5) of each distributed zone controller 771, 772, 773, 774 is coupled to the receive electrodes of the associated zone. The sense unit in combination with the coupling capacitance, performs a differentiation on the drive signal supplied by the drive unit. An ADC unit is coupled to the sense unit and is configured to convert an amplitude of the response signal generated by the sense unit into a digital format. In some implementations, the drive and sense units may also include one or more peak detection circuit (e.g., 526a of FIG. 5) that may also serve as a sample/hold buffer, and associated reset circuit (e.g., 526b of FIG. 5) operable to reset the peak detector. In some embodiments, each zone controller 771, 772, 773, 774 includes multiple sense units, multiple peak detection circuits and multiple reset circuits to allow simultaneous sensing from multiple receive electrodes in a zone. In very high speed applications, each zone controller 771, 772, 773, 774 may include multiple ADCs for the associated zone.

Each of the distributed zone controllers 771, 772, 773, 774 includes a zone analyzer configured to determine a touch location in the associated zone. The zone controllers 771, 772, 773, 774 coordinate with each other to determine touch locations of touches that span zones. For example the zone controllers 771, 772, 773 may share raw data from the adjacent border area of their associated zone to a neighboring zone controller 772, 773, 774 via outputs 771a, 772a, 773a, 774a. Each output 771a, 772a, 773a, 774a may be carried by a high speed data link such as an Ethernet link. The analyzer of each zone controller may be capable of resolving touches that span its associated zone and that of at least one of its nearest neighbors, e.g., a downstream neighbor.

In some embodiments, one of the distributed zone controllers, e.g., the last in the chain as depicted in FIG. 7B can provide the touch location information across all zones A-D. In some embodiments, the last controller in the chain transfers the data from all controllers to an additional controller that can provide the touch information across all zones A-D. Touch information spanning multiple zones can be determined using an aggregator function, e.g. residing in the last zone controller in the chain as shown in FIG. 7 or in the additional controller (not shown in FIG. 1) that receives information for each zone. The aggregator function translates, merges, and/or concatenates individual zone threads into global touch threads. The aggregator may output the global touch threads to a host computer, e.g., a Human Interface Device (HIB) via a universal serial bus (USB) connection using a standardized format.

Figure 8:
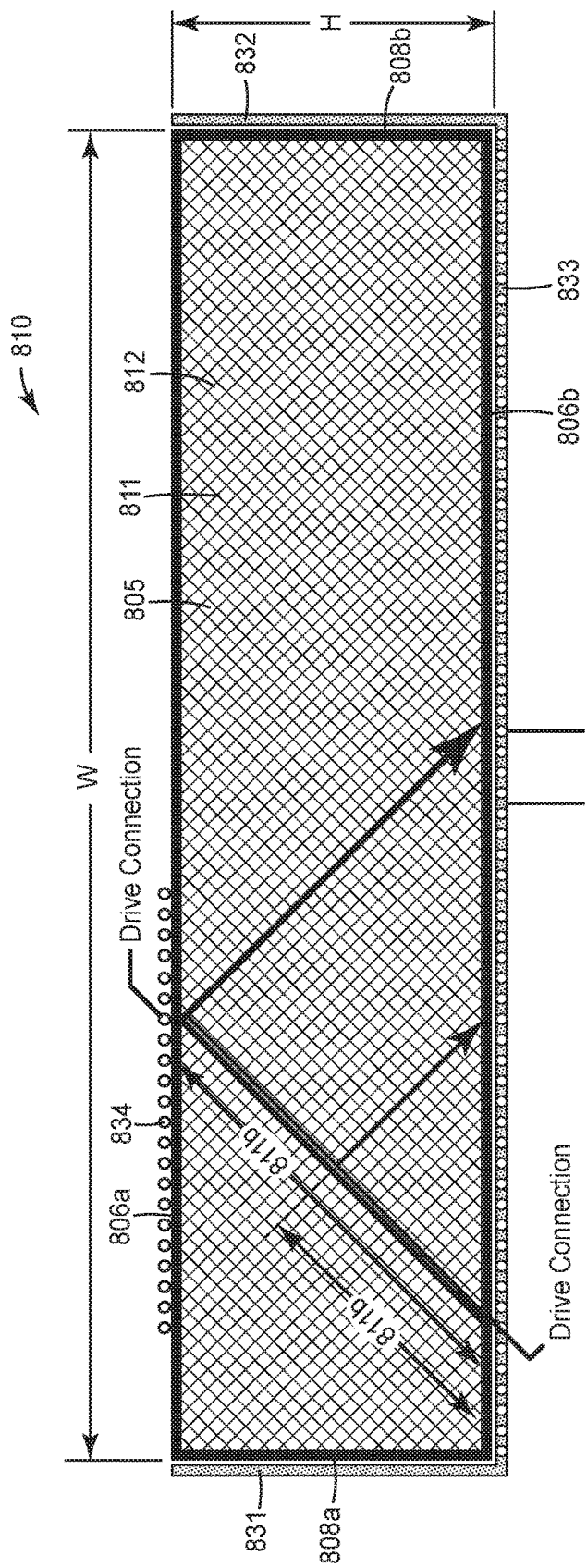
FIG. 8 is a schematic view of a touch panel having contact areas configured so that both ends of the drive electrodes can be driven with a drive signal.

In some implementations, it may be helpful to apply the drive signal to the drive electrodes from both ends, as illustrated by the touch panel 810 of FIG. 8. Touch panel 810 includes a continuous touch sensitive area 805 similar in some respects to the touch sensitive area of FIG. 1A. Drive 811 and receive 812 electrodes are spaced apart in the touch sensitive area 805 and traverse each other at a plurality of nodes. The drive electrodes 811 extend continuously across the touch sensitive area 805 along a first direction and the receive electrodes 812 extend continuously across the touch sensitive area 805 along a second direction that is different from the first direction. Each drive electrode 811 traverses at least one, but not all, of the receive electrodes 812, and each receive electrode 812 traverses at least one, but not all, of the drive electrodes 811.

As shown in FIG. 8, drive electrode contacts and/or leads 831 may be disposed in the border area along height-wise edge 108a of the touch sensitive area 805; receive electrode contacts and/or leads 832 may be disposed in the border area along height-wise edge 808b of the touch sensitive area 805; and interdigitated drive/receive contacts and/or leads 833 may be disposed in a border area along the width-wise edge 806b of the touch sensitive area 805. When the drive electrodes 811 are driven from both ends, drive contacts and/or leads 834 are disposed in a border area along the width-wise edge 806a. Driving from both ends of the drive electrode 812 cuts the electrode drive path length in half, which may facilitate touch location sensing. FIG. 8 illustrates the drive path length 811a for single-ended driving and the drive path length 811b for dual ended driving.

The width of border areas of a touch panel can be dependent on how electrical connections are made between touch electrodes and the contacts and/or leads that electrically couple the touch electrodes to the controller. In some configurations, the electrical contacts between the drive electrodes and the drive contacts and/or leads are adjacent to electrical contacts between the receive electrodes and the receive contacts and/or leads. Particularly when the electrical contacts for the drive and receive electrodes are close and and/or face in the same direction the regions near these electrical contacts may have stray capacitance values that are out of range compared to other areas.

Figure 9A:
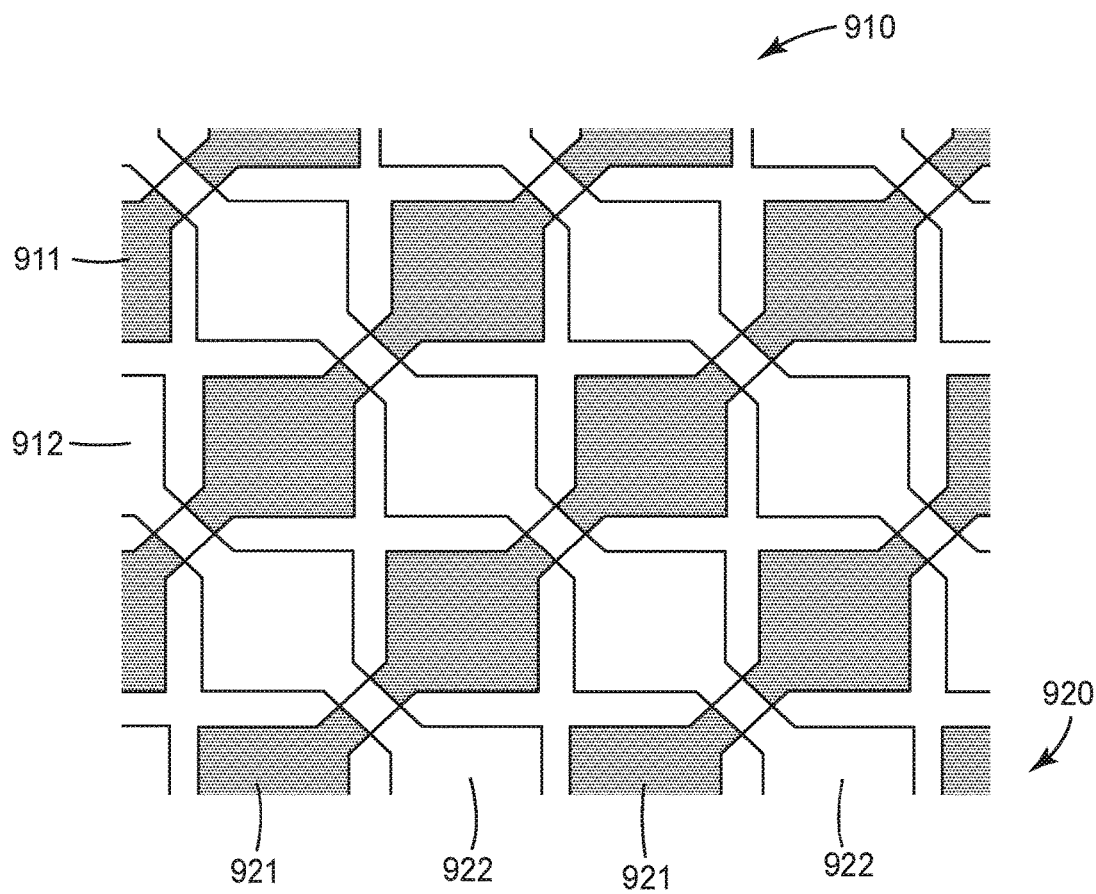
FIG. 9A shows a plan view (upper) and a side view (lower) of a border area of a touch panel that includes drive electrodes and receive electrodes extending into the border area.
Figure 9A:
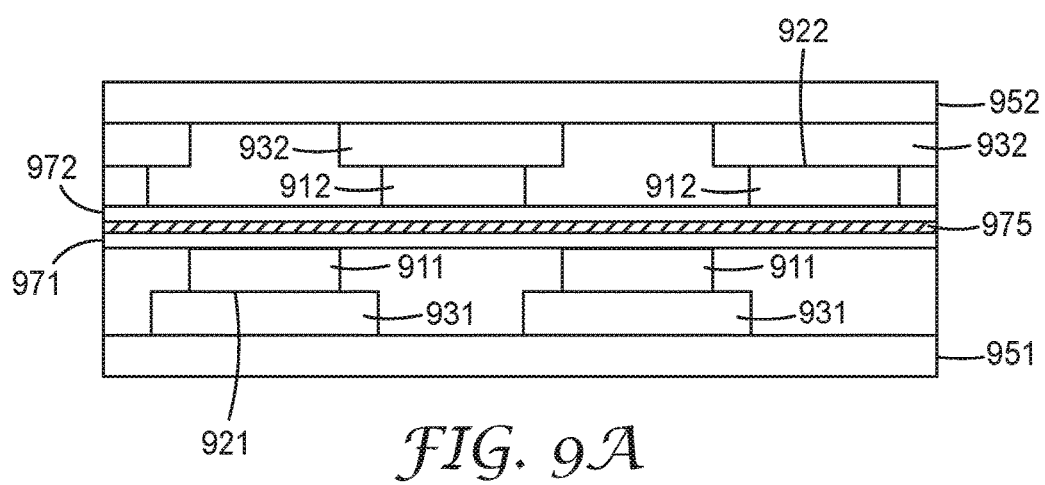

FIG. 9A shows a plan view (upper) and a side view (lower) of portion of a touch panel 910 that includes drive electrodes and receive electrodes. The plan view indicates the drive and receive electrodes 911, 912 and electrical contact surfaces 921, 922 of the electrodes 911, 912. The side view of FIG. 9A shows the drive and receive electrodes 911, 912 disposed between a front layer 952 and a rear layer 951 and having opposite facing contact surfaces 921, 922. The drive and receive electrodes 911, 912 are electrically connected to the drive 931 and receive 932 lead contacts in the border area 920. The opposite facing contact surfaces 921, 922 of the drive and receive electrodes 911, 912 as shown in FIG. 9A mitigate out of range stray capacitance values.

In some implementations, a low impedance shield 975, e.g., a ground plane or virtual ground plane may be inserted between the drive and receive electrodes 911, 912 in the border area 920. Insulating layers 971, 972 are disposed on either side of the shield 975. The shield 975 can be grounded or driven with a waveform that reduces signal coupling.

Figure 9B:
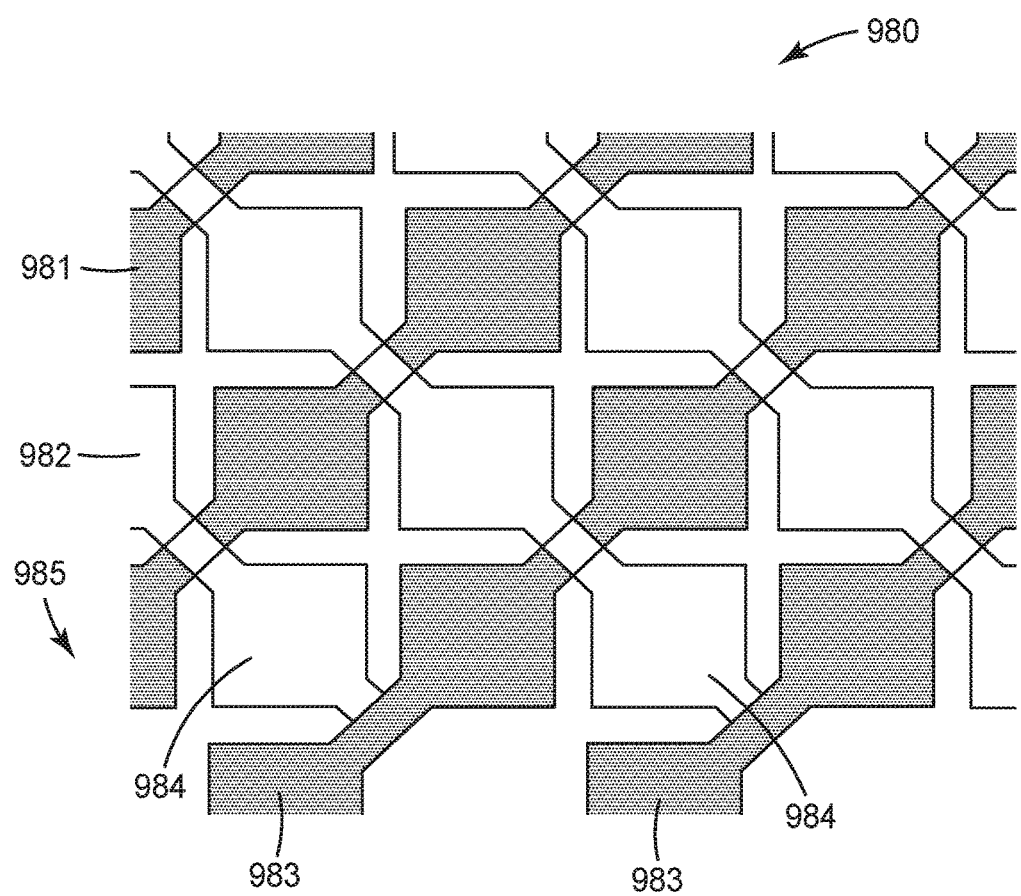
FIG. 9B illustrates a border area design for a touch panel that mitigates stray capacitance when drive and receive electrode contact surfaces face in the same direction.

FIG. 9B illustrates a border area design that mitigates stray capacitance when drive and receive electrode contact surfaces point face in the same direction. In this design, the drive electrodes extend further into the border area than the receive electrodes to increase the spacing between drive and receive contact surfaces.

The portion of the touch panel 980 includes drive 981 and receive 982 electrodes that extend into a border area 985 is shown in FIG. 9B In the border area 985, the drive electrodes 981 include contact surfaces 983 and the receive electrodes 982 include contact surfaces 984, where both drive and receive electrode contact surfaces 983, 984 face the same direction. To mitigate stray capacitive coupling between the drive and receive electrodes 981, 982, the drive electrodes 931 extend farther into the border area 985 than the receive electrodes 982. Alternatively, it is possible for the receive electrodes to extend further into the border area than the drive electrodes. This design increases the area of the border area, allows electrical connections to be made to both drive and receive electrodes facing the same direction and also mitigates stray capacitance between drive and receive electrodes by increasing the spacing between drive and receive electrodes.

Figure 10A:
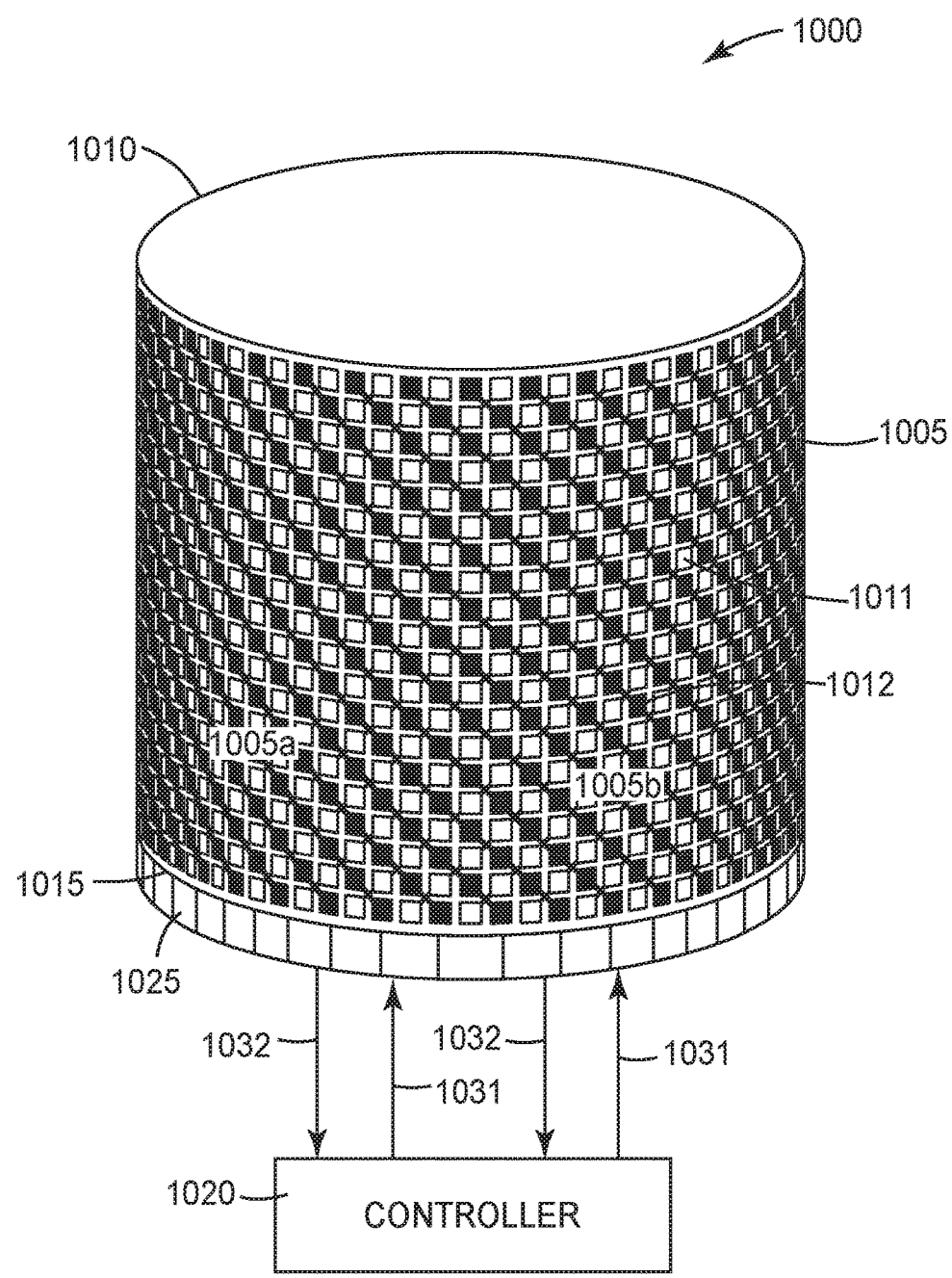
FIG. 10A illustrates a touch sensitive system that includes a cylindrical touch panel.

Using touch panels having touch sensitive areas as described herein allows for touch panels of any unsegmented width because the neither drive nor receive electrodes span across the entire width of the touch sensitive surface and the length of the drive and receive electrodes is dependent on touch surface height, not width. These touch panels need not be flat, rectangular panels, but can be formed in a variety of three dimensional geometrical shapes, e.g., various cylindrical or polyhedron shapes. FIG. 10A illustrates a touch sensitive system 1000 including touch panel 1010 and controller 1020. Touch sensitive system 1000 is similar in some respects to touch sensitive system 100 discussed in connection with FIG. 1A. One difference between touch sensitive system 1000 and touch sensitive system 100 is that touch panel 1010 is formed into the shape of a cylinder. Touch panel 1010 includes a continuous cylindrical touch sensitive area 1005 having a plurality of first electrodes 1011 that are spaced apart across the touch sensitive area 1005 along a first direction. A plurality of second electrodes 1012 are spaced apart across the touch sensitive area 1005 along a second direction that is different from the first direction. The touch sensitive area 1005 includes a plurality of nodes, each node being defined by corresponding first and second electrodes 1011, 1012 traversing each other at the node. Each first electrode 1011 traverses at least one, but not all, of the second electrodes 1012, and each second electrode 1012 traverses at least one, but not all, of the first electrodes 1011. The touch sensitive system 1000 is capable of detecting a location of a touch applied proximate a node by detecting a change in a coupling capacitance between the corresponding first and second electrodes traversing each other at the node.

The first and second electrodes 1011, 1012 are grouped into multiple zones 1005a, 1005b of the touch sensitive surface 1005. The controller 1020 includes drive circuitry coupled to the drive electrodes and configured to scan through the drive electrodes, e.g., first electrodes 1010, of a zone one by one. In this manner, all zones on the touch sensitive surface can be scanned simultaneously. The controller 1020 includes sense circuitry coupled to receive electrodes and configured to receive response signals carried on the receive electrodes (e.g., second electrodes 1012), the response signals being affected by a touch on the touch sensitive surface 1005. Touch panel 1010 includes a border area 1015 where connections are made between the drive electrodes 1011 and drive leads 1031 and between receive electrodes 1012 and receive leads 1032. The drive and receive leads 1031, 1032 couple the drive and receive electrodes 1011, 1012 to the controller 1020. For a cylindrical touch panel (or a touch panel having another closed shape) using single ended drive signals, all electrical connections between the drive and receive electrodes 1011, 1012 and the drive leads 1031 and receive leads 1032 can be arranged in a border area 1025 disposed along a single edge 1015 of the touch sensitive surface 1005. The use angled electrodes 1011, 1012 avoids a distribution region in the viewable space that would be present if some of the electrodes were arranged circumferentially around the cylinder.

Figure 10B:
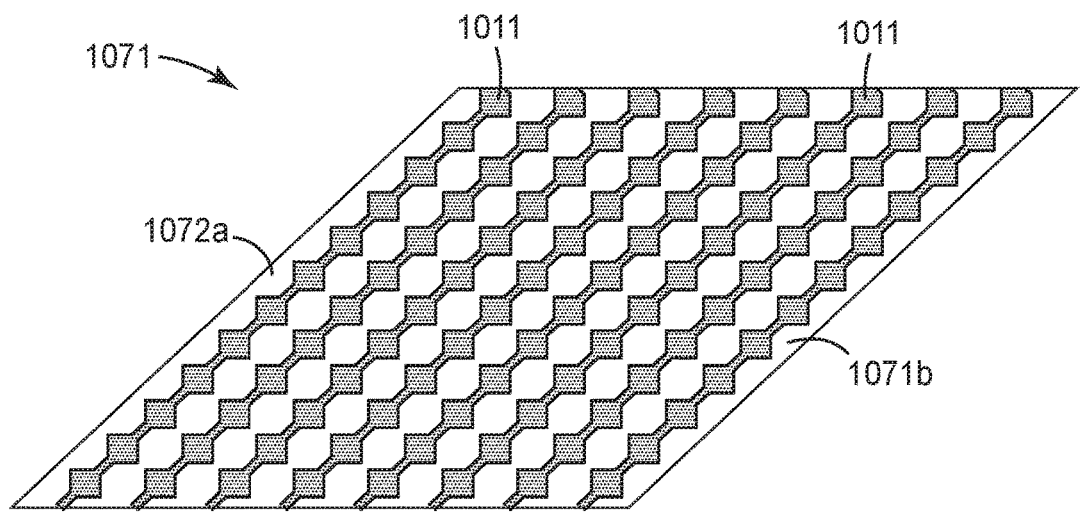
FIGS. 10B and 10C show the electrode layers of the cylindrical touch panel of FIG. 10A.
Figure 10C:
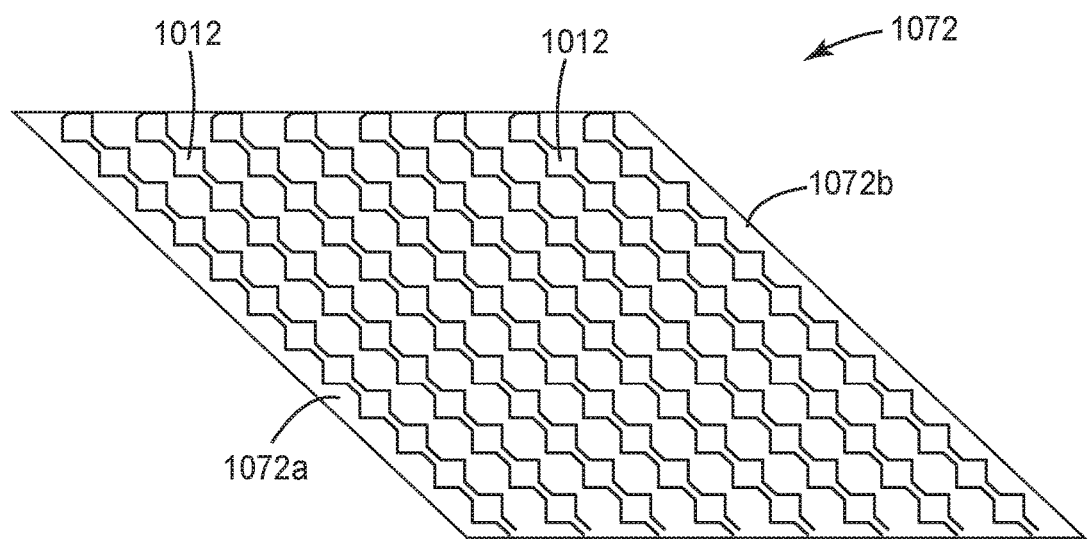
Figure 10D:
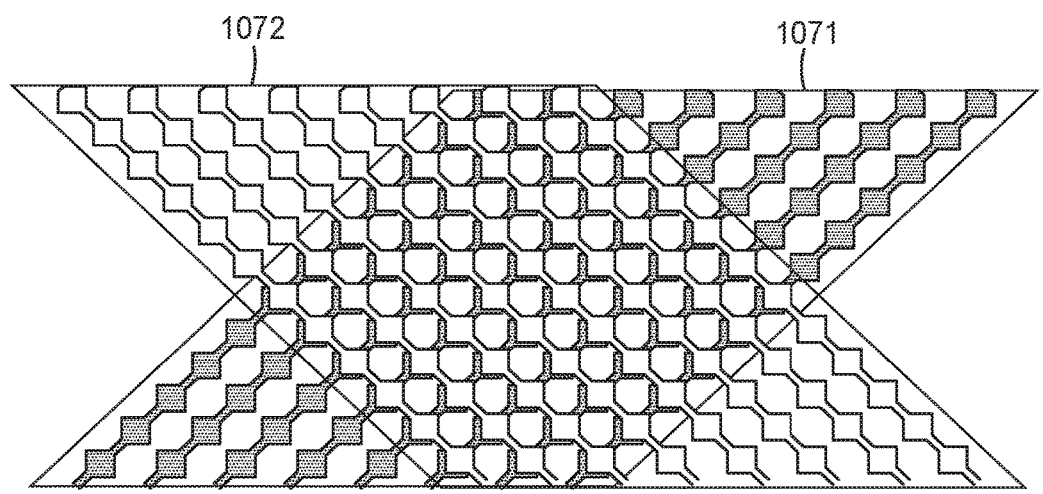
FIG. 10D shows the electrode layers of FIGS. 10B and 10C overlaid and in a flat configuration.

To form the cylindrical touch surface 1005, the pattern of the drive 1011 and receive 1012 electrodes should be adapted to the circumference of the cylinder to avoid shorter or longer pitch where the patterns meet. According to some embodiments, the first and second electrodes 1011, 1012 are disposed in layers 1071, 1072 shown in FIGS. 10B and 10C, respectively. The layers 1071, 1072 can be separately applied to a cylindrical substrate or form, where the edges 1071a, 1071b, 1072a, 1072b of each layer 1071, 1072 are aligned to maintain the pattern pitch. FIG. 10D shows layers 1071, 1072 (overlaid and flat) that are used to form the cylindrical touch area shown in FIG. 10A.

Embodiments disclosed herein include:

Item 1. A touch sensitive system, comprising:
a touch sensitive area;
a plurality of spaced apart first electrodes disposed in the touch sensitive area and extending along a first direction;

a plurality of spaced apart second electrodes disposed in the touch sensitive area and extending along a different second direction, each first and second electrode extending continuously across the touch sensitive area; and a plurality of nodes, each node being defined by corresponding first and second electrodes traversing each other at the node, the touch sensitive system being configured to detect a location of a touch applied proximate a node by detecting a change in a coupling capacitance between the corresponding first and second electrodes traversing each other at the node, wherein each first electrode traverses at least one, but not all, of the second electrodes, and each second electrode traverses at least one, but not all, of the first electrodes.

Item 2. The touch sensitive system of item 1, wherein the touch sensitive area has a width and a height and the width is at least two times the height and wherein a length of a majority of the first electrodes is substantially equal to a length of a majority of the second electrodes.

Item 3. The touch sensitive system of any of items 1 through 2, wherein the touch sensitive area has a width and a height and the width is at least two times the height and wherein a resistance of a majority of the first electrodes is substantially equal to a resistance of a majority of the second electrodes.

Item 4. A touch sensitive system, comprising:
a continuous touch sensitive area;
a plurality of spaced apart first electrodes disposed in the touch sensitive area and extending along a first direction;
a plurality of spaced apart second electrodes disposed in the touch sensitive area and extending along a different second direction; and
a plurality of nodes, each node being defined by corresponding first and second electrodes traversing each other at the node, the touch sensitive system being configured to detect a location of a touch applied proximate a node by detecting a change in a coupling capacitance between the corresponding first and second electrodes traversing each other at the node, wherein each first electrode traverses at least one, but not all, of the second electrodes, and each second electrode traverses at least one, but not all, of the first electrodes.

Item 5. The touch sensitive system of item 4, wherein the touch sensitive area has a height and a width, wherein the width of the touch sensitive area is greater than the height of the touch sensitive area.

Item 6. The touch sensitive system of any of items 4 through 5, wherein the touch sensitive area is curved along the width.

Item 7. The touch sensitive system of any of items 4 through 6, wherein the touch sensitive area forms a cylinder or polyhedron.

Item 8. The touch sensitive system of any of items 4 through 7, wherein at least one of the first direction and the second direction form an acute angle with respect to a height direction of the touch sensitive area.

Item 9. The touch sensitive system of item 8, wherein both the first direction and the second direction form an acute angle with respect to the height direction.

Item 10. The touch sensitive area of item 8, wherein the first direction and the second direction are orthogonal to each other.

Item 11. A touch sensitive system, comprising:
a continuous touch sensitive area;
a plurality of electrodes disposed in the touch sensitive area, each electrode extending continuously across the continuous touch sensitive area; and a plurality of nodes, each node corresponding to and being defined by two different electrodes in the plurality of electrodes traversing each other at the node, the touch sensitive system being configured to detect a location of a touch applied proximate a node by detecting a change in a coupling capacitance between the two different electrodes traversing each other at the node, wherein each electrode in the plurality of electrodes traverses at least one, but not all, of the other electrodes in the plurality of electrodes.

Item 12. A touch sensitive system, comprising:
a touch sensitive area having a ratio between height and width greater than 2:1 and having a touch resolution that is substantially uniform across the touch sensitive area;
a plurality of spaced apart first electrodes disposed in the touch sensitive area and extending along a first direction;
a plurality of spaced apart second electrodes disposed in the touch sensitive area and extending along a different second direction; and
a plurality of nodes, each node being defined by corresponding first and second electrodes traversing each other at the node, the touch sensitive system being configured to detect a location of a touch applied proximate a node by detecting a change in a coupling capacitance between the corresponding first and second electrodes traversing each other at the node, wherein each first electrode traverses at least one, but not all, of the second electrodes, and each second electrode traverses at least one, but not all, of the first electrodes.

Item 13. The touch sensitive system of item 12, further comprising a border area disposed along at least one edge of the touch sensitive area, wherein the first electrodes extend farther into the border area than the second electrodes, wherein the first and second electrodes have electrical contacts in the border area and conductive surfaces of the electrical contacts of the first electrodes face in a same direction as conductive surfaces of the electrical contacts of the second electrodes.

Item 14. The touch sensitive system of item 12, further comprising a border area disposed along at least one edge of the touch sensitive area, wherein the first and second electrodes extend into the border area, wherein the first and second electrodes have electrical contacts in the border area and conductive surfaces of the electrical contacts of the first electrodes face in an opposite direction from conductive surfaces of the electrical contacts of the second electrodes.

Item 15. The touch sensitive system of item 14, wherein the electrical contacts of the first electrodes are separated from the electrical contacts of the second electrodes by a low impedance layer.

Item 16. The touch sensitive system of item 15, wherein the low impedance layer comprises a ground plane or virtual ground plane.

Item 17. A touch sensitive system, comprising:
a touch sensitive area;
a plurality of spaced apart drive electrodes disposed in the touch sensitive area and extending along a first direction;
a plurality of spaced apart receive electrodes disposed in the touch sensitive area and extending along a different second direction, each first and second electrode extending continuously across the touch sensitive area;
a plurality of nodes, each node being defined by corresponding drive and receive electrodes traversing each other at the node, the touch sensitive system being configured to detect a location of a touch applied proximate a node by detecting a change in a coupling capacitance between the corresponding drive and receive electrodes traversing each other at the node; and a drive unit configured to generate a drive signal and to simultaneously deliver the drive signal to at least two, but not all, the drive electrodes, wherein no two drive electrodes in the at least two, but not all, the drive electrodes traverse a same receive electrode.

Item 18. The touch sensitive system of item 17, further comprising a sense unit configured to generate, for each drive signal delivered to the at least two, but not all, the drive electrodes, response signals for the plurality of receive electrodes, an amplitude of the response signal from each receive electrode corresponding to a coupling capacitance at the node defined by the receive electrode and a driven drive electrode in the at least two, but not all, the drive electrodes, the response signal comprising a differentiated representation of the drive signal.

Item 19. The touch sensitive system of item 18, further comprising an analyzer configured to measure the amplitude of each of the response signals for each of the nodes, and to determine therefrom the positions of multiple temporally overlapping touches, if present, in the touch sensitive area.

Item 20. The touch sensitive system of item 19, wherein the touch sensitive area is configured to be divided into a plurality of scan zones, each drive electrode in a scan zone traversing all the receive electrodes in the scan zone and not traversing any receive electrode in any other scan zone.

Item 21. The touch sensitive system of item 20, wherein the drive unit is configured to generate a drive signal and to simultaneously deliver the drive signal to at least one, but not all, the drive electrodes in each scan zone.

Item 22. The touch sensitive system of any of items 17 through 21, wherein the drive unit is configured to drive the drive electrodes from both ends of the drive electrodes.

Item 23. A touch sensitive system, comprising:
a touch sensitive area;
a plurality of spaced apart drive electrodes disposed in the touch sensitive area and extending along a first direction;
a plurality of spaced apart receive electrodes disposed in the touch sensitive area and extending along a different second direction, each first and second electrode extending continuously across the touch sensitive area, the drive electrodes and the receive electrodes arranged in a plurality of scan zones, each drive electrode in a scan zone traversing all the receive electrodes in the scan zone and not traversing any receive electrode in any other scan zone; and
a plurality of nodes, each node being defined by corresponding drive and receive electrodes traversing each other at the node, the touch sensitive system being configured to detect a location of a touch applied proximate a node by detecting a change in a coupling capacitance between the corresponding drive and receive electrodes traversing each other at the node.

Item 24. The touch sensitive system of item 23, further comprising a touch controller including:
multiple zone drive/sense units, each zone drive/sense unit configured generate drive signals for drive electrodes and response signals for receive electrodes for a scan zone; and
an analyzer coupled to an output of each of the multiple zone drive/sense units, the analyzer configured to determine multi-touch locations based on the response signals.

Item 25. The touch sensitive system of item 24, wherein the analyzer is configured to use information from at least two zone drive/sense units to determine a touch location that occurs across two scan zones.

Item 26. The touch sensitive system of item 23, further comprising multiple zone controllers, each zone controller including:

a drive unit configured generate drive signals for drive electrodes for the scan zone;
a sense unit configured to generate response signals for receive electrodes for the scan zone; and
an analyzer configured to determine touch locations based on the response signals.

Item 27. The touch sensitive system of item 26, wherein the zone controllers are communicatively coupled and each zone controller is configured to determine a touch location that occurs across a scan zone of the zone controller and a neighboring scan zone.

Item 28. The touch sensitive system of item 26, wherein the zone controllers are communicatively coupled and are configured to determine positions of multiple temporally overlapping touches, if present, in the touch sensitive area.

Item 29. The touch sensitive system of any of items 23 through 28, wherein the touch sensitive area forms a three dimensional shape and the drive and receive electrodes are electrically accessible at only one edge of the touch sensitive area.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

Various modifications and alterations of this invention will be apparent to those skilled in the art and it should be understood that this scope of this disclosure is not limited to the illustrative embodiments set forth herein. For example, the reader should assume that features of one disclosed embodiment can also be applied to all other disclosed embodiments unless otherwise indicated.

The invention claimed is:

1. A touch sensitive system, comprising:
a touch sensitive area;
a plurality of spaced apart first electrodes disposed in the touch sensitive area and extending along a first direction;
a plurality of spaced apart second electrodes disposed in the touch sensitive area and extending along a different second direction, each first and second electrode extending continuously across the touch sensitive area; and
a plurality of nodes, each node being defined by corresponding first and second electrodes traversing each other at the node, the touch sensitive system being configured to detect a location of a touch applied proximate a node by detecting a change in a coupling capacitance between the corresponding first and second electrodes traversing each other at the node, wherein each first electrode traverses at least one, but not all, of the second electrodes, and each second electrode traverses at least one, but not all, of the first electrodes; and
a touch controller comprising:
multiple zone drive/sense units, each zone drive/sense unit configured to generate drive signals for drive electrodes and response signals for receive electrodes for a scan zone; and an analyzer coupled to an output of each of the multiple zone drive/sense units, the analyzer configured to determine multi-touch locations based on the response signals.

2. The touch sensitive system of claim 1, wherein the touch sensitive area has a width and a height and the width is at least two times the height and wherein a length of a majority of the first electrodes is substantially equal to a length of a majority of the second electrodes.

3. The touch sensitive system of claim 1, wherein the touch sensitive area has a width and a height and the width is at least two times the height and wherein a resistance of a majority of the first electrodes is substantially equal to a resistance of a majority of the second electrodes.

4. A touch sensitive system, comprising:
a continuous touch sensitive area;
a plurality of spaced apart first electrodes disposed in the touch sensitive area and extending along a first direction;
a plurality of spaced apart second electrodes disposed in the touch sensitive area and extending along a different second direction;
a plurality of nodes, each node being defined by corresponding first and second electrodes traversing each other at the node, the touch sensitive system being configured to detect a location of a touch applied proximate a node by detecting a change in a coupling capacitance between the corresponding first and second electrodes traversing each other at the node, wherein each first electrode traverses at least one, but not all, of the second electrodes, and each second electrode traverses at least one, but not all, of the first electrodes; and
multiple zone controllers, each zone controller comprising:
a drive unit configured to generate drive signals for drive electrodes for the scan zone;
a sense unit configured to generate response signals for receive electrodes for the scan zone; and
an analyzer configured to determine touch locations based on the response signals.

5. The touch sensitive system of claim 4, wherein the touch sensitive area has a height and a width, wherein the width of the touch sensitive area is greater than the height of the touch sensitive area.

6. The touch sensitive system of claim 5, wherein the touch sensitive area is curved along the width.

7. The touch sensitive system of claim 6, wherein the touch sensitive area forms a cylinder or polyhedron.

8. The touch sensitive system of claim 4, wherein at least one of the first direction and the second direction form an acute angle with respect to a height direction of the touch sensitive area.

9. The touch sensitive system of claim 8, wherein both the first direction and the second direction form an acute angle with respect to the height direction.

10. The touch sensitive area of claim 8, wherein the first direction and the second direction are orthogonal to each other.

11. A touch sensitive system, comprising:
a touch sensitive area having a ratio between height and width greater than 2:1 and having a touch resolution that is substantially uniform across the touch sensitive area;
a plurality of spaced apart first electrodes disposed in the touch sensitive area and extending along a first direction;
a plurality of spaced apart second electrodes disposed in the touch sensitive area and extending along a different second direction;
a plurality of nodes, each node being defined by corresponding first and second electrodes traversing each other at the node, the touch sensitive system being configured to detect a location of a touch applied proximate a node by detecting a change in a coupling capacitance between the corresponding first and second electrodes traversing each other at the node, wherein each first electrode traverses at least one, but not all, of the second electrodes, and each second electrode traverses at least one, but not all, of the first electrodes; and
a touch controller comprising:
multiple zone first/second units, each zone first/second unit configured to generate first signals for first electrodes and second signals for second electrodes for a scan zone, and
an analyzer coupled to an output of each of the multiple zone first/second units, the analyzer configured to determine multi-touch locations based on the second signals.

12. The touch sensitive system of claim 11, further comprising a border area disposed along at least one edge of the touch sensitive area, wherein the first electrodes extend farther into the border area than the second electrodes, wherein the first and second electrodes have electrical contacts in the border area and conductive surfaces of the electrical contacts of the first electrodes face in a same direction as conductive surfaces of the electrical contacts of the second electrodes.

13. The touch sensitive system of claim 11, further comprising a border area disposed along at least one edge of the touch sensitive area, wherein the first and second electrodes extend into the border area, wherein the first and second electrodes have electrical contacts in the border area and conductive surfaces of the electrical contacts of the first electrodes face in an opposite direction from conductive surfaces of the electrical contacts of the second electrodes.

14. The touch sensitive system of claim 13, wherein the electrical contacts of the first electrodes are separated from the electrical contacts of the second electrodes by a low impedance layer.

15. The touch sensitive system of claim 14, wherein the low impedance layer comprises a ground plane or virtual ground plane.

16. A touch sensitive system, comprising:
a touch sensitive area;
a plurality of spaced apart drive electrodes disposed in the touch sensitive area and extending along a first direction;
a plurality of spaced apart receive electrodes disposed in the touch sensitive area and extending along a different second direction, each drive and receive electrode extending continuously across the touch sensitive area, the drive electrodes and the receive electrodes arranged in a plurality of scan zones, each drive electrode in a scan zone traversing all the receive electrodes in the scan zone and not traversing any receive electrode in any other scan zone;
a plurality of nodes, each node being defined by corresponding drive and receive electrodes traversing each other at the node, the touch sensitive system being configured to detect a location of a touch applied proximate a node by detecting a change in a coupling capacitance between the corresponding drive and receive electrodes traversing each other at the node; and multiple zone controllers, each zone controller comprising:
- a drive unit configured to generate drive signals for drive electrodes for the scan zone;
- a sense unit configured to generate response signals for receive electrodes for the scan zone; and
- an analyzer configured to determine touch locations based of the response signals.

17. The touch sensitive system of claim 16, wherein the zone controllers are communicatively coupled and each zone controller is configured to determine a touch location that occurs across a scan zone of the zone controller and a neighboring scan zone.

18. The touch sensitive system of claim 16, wherein the zone controllers are communicatively coupled and are configured to determine positions of multiple temporally overlapping touches, if present, in the touch sensitive area.

19. The touch sensitive system of claim 16, wherein the touch sensitive area forms a three dimensional shape and the drive and receive electrodes are electrically accessible at only one edge of the touch sensitive area.

* * * * *